(12) United States Patent
Wehrman et al.

(10) Patent No.: US 10,908,764 B2
(45) Date of Patent: Feb. 2, 2021

(54) INTER-CONTEXT COORDINATION TO FACILITATE SYNCHRONIZED PRESENTATION OF IMAGE CONTENT

(71) Applicant: Adobe Inc., San Jose, CA (US)

(72) Inventors: Ian A. Wehrman, San Francisco, CA (US); John N. Fitzgerald, San Jose, CA (US); Joel R. Brandt, San Francisco, CA (US); Jesper Storm Bache, Menlo Park, CA (US); David A. Tristram, Santa Cruz, CA (US); Barkin Aygun, Bend, OR (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/109,637

(22) Filed: Aug. 22, 2018

(65) Prior Publication Data
US 2018/0364873 A1 Dec. 20, 2018

Related U.S. Application Data

(63) Continuation of application No. 14/878,369, filed on Oct. 8, 2015, now Pat. No. 10,073,583.

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/0485* (2013.01); *G06F 3/04845* (2013.01);
(Continued)

(58) Field of Classification Search
CPC ... G06F 3/0481; G06F 3/04845; G06F 3/0485
See application file for complete search history.

(56) References Cited

U.S. PATENT DOCUMENTS

| 5,561,757 A | 10/1996 | Southgate |
| 5,617,114 A | 4/1997 | Bier et al. |

(Continued)

OTHER PUBLICATIONS

"Non-Final Office Action", U.S. Appl. No. 14/853,197, dated Oct. 17, 2018, 18 pages.

(Continued)

*Primary Examiner* — Nicholas Augustine
(74) *Attorney, Agent, or Firm* — SBMC

(57) ABSTRACT

Inter-context coordination to facilitate synchronized presentation of image content is described. In example embodiments, an application includes multiple execution contexts that coordinate handling user interaction with a coordination policy established using an inter-context communication mechanism. The application produces first and second execution contexts that are responsible for user interaction with first and second image content, respectively. Generally, the second execution context provides a stipulation for the coordination policy to indicate which execution context is to handle a response to a given user input event. With an event routing policy, an event routing rule informs the first execution context if a user input event should be routed to the second execution context. With a pixel authorization policy, a pixel authorization grant informs the first execution context of an authorization to manipulate pixels of the second image content in response to a user input event affecting pixels of the first image content.

20 Claims, 11 Drawing Sheets

(51) Int. Cl.
*G06F 3/0484* (2013.01)
*G06F 3/0485* (2013.01)
*G06F 9/451* (2018.01)
*G06F 8/38* (2018.01)
*G06T 11/60* (2006.01)
*G06F 3/01* (2006.01)

(52) U.S. Cl.
CPC ............... *G06F 8/38* (2013.01); *G06F 9/451* (2018.02); *G06T 11/60* (2013.01); *G06F 2203/04806* (2013.01)

(56) References Cited

U.S. PATENT DOCUMENTS

| | | | |
|---|---|---|---|
| 5,712,995 | A | 1/1998 | Cohn |
| 5,796,402 | A | 8/1998 | Ellison-Taylor |
| 5,805,163 | A | 9/1998 | Bagnas |
| 5,838,318 | A | 11/1998 | Porter |
| 6,008,809 | A | 12/1999 | Brooks |
| 6,075,531 | A | 6/2000 | DeStefano |
| 6,188,405 | B1 | 2/2001 | Czerwinski et al. |
| 6,252,595 | B1 | 6/2001 | Birmingham et al. |
| 6,486,898 | B1 | 11/2002 | Martino et al. |
| 6,529,910 | B1 | 3/2003 | Fleskes |
| 6,717,596 | B1* | 4/2004 | Nason ............... G06F 3/038 715/788 |
| 7,249,993 | B2 | 7/2007 | Wagner |
| 7,395,310 | B1* | 7/2008 | Sikora ............... H04Q 3/0045 701/86 |
| 7,421,702 | B1 | 9/2008 | Margulis et al. |
| 7,559,034 | B1 | 7/2009 | Paperny et al. |
| 7,783,983 | B1 | 8/2010 | Mayers et al. |
| 7,913,177 | B1 | 3/2011 | Smith et al. |
| 8,387,006 | B1 | 2/2013 | Taylor |
| 9,081,463 | B2 | 7/2015 | Taylor et al. |
| 9,134,789 | B2 | 9/2015 | Cotlarciuc |
| 9,609,020 | B2* | 3/2017 | White ............... H04L 63/20 |
| 9,736,126 | B2* | 8/2017 | Borovoy ............ H04L 63/0807 |
| 9,740,293 | B2 | 8/2017 | Kramer et al. |
| 9,923,880 | B2* | 3/2018 | Borovoy ............ G06F 21/33 |
| 9,934,498 | B2* | 4/2018 | Jung ............... G06Q 30/0609 |
| 10,073,583 | B2 | 9/2018 | Wehrman et al. |
| 2001/0056370 | A1 | 12/2001 | Tafla |
| 2002/0016969 | A1 | 2/2002 | Kimble |
| 2002/0027570 | A1 | 3/2002 | Muto et al. |
| 2002/0104096 | A1 | 8/2002 | Cramer |
| 2002/0124022 | A1 | 9/2002 | Yoo |
| 2003/0063119 | A1 | 4/2003 | Bloomfield et al. |
| 2004/0093563 | A1 | 5/2004 | Pasquali |
| 2004/0148576 | A1 | 7/2004 | Matveyenko et al. |
| 2004/0172343 | A1 | 9/2004 | Allibhoy et al. |
| 2004/0199603 | A1 | 10/2004 | Tafla et al. |
| 2004/0220963 | A1 | 11/2004 | Chen et al. |
| 2004/0255253 | A1 | 12/2004 | Marcjan |
| 2004/0261131 | A1 | 12/2004 | Zigmond et al. |
| 2005/0108095 | A1 | 5/2005 | Perlmutter |
| 2005/0114430 | A1 | 5/2005 | Zheng et al. |
| 2005/0166158 | A1 | 7/2005 | Blanchard et al. |
| 2005/0198315 | A1 | 9/2005 | Wesley et al. |
| 2005/0198571 | A1 | 9/2005 | Kramer et al. |
| 2006/0059432 | A1 | 3/2006 | Bells |
| 2006/0117272 | A1 | 6/2006 | Sawada et al. |
| 2006/0224697 | A1 | 10/2006 | Norris |
| 2007/0061721 | A1 | 3/2007 | Bustelo et al. |
| 2007/0078846 | A1 | 4/2007 | Gulli et al. |
| 2007/0136579 | A1* | 6/2007 | Levy ............... H04L 63/102 713/168 |
| 2007/0233692 | A1 | 10/2007 | Lisa et al. |
| 2008/0046562 | A1 | 2/2008 | Butler |
| 2008/0209311 | A1 | 8/2008 | Agronik et al. |
| 2008/0256467 | A1 | 10/2008 | Chu et al. |
| 2008/0288976 | A1 | 11/2008 | Carson et al. |
| 2008/0307308 | A1 | 12/2008 | Sullivan et al. |
| 2009/0031246 | A1 | 1/2009 | Cowtan et al. |
| 2009/0049385 | A1 | 2/2009 | Blinnikka et al. |
| 2009/0204928 | A1 | 8/2009 | Kallio et al. |
| 2010/0005396 | A1* | 1/2010 | Nason ............... G06F 21/84 715/746 |
| 2010/0017737 | A1 | 1/2010 | Berger |
| 2010/0088623 | A1 | 4/2010 | Ichino |
| 2010/0210357 | A1 | 8/2010 | Slough et al. |
| 2011/0202424 | A1 | 8/2011 | Chun et al. |
| 2014/0040638 | A1* | 2/2014 | Barton ............... H04L 41/28 713/193 |
| 2014/0047413 | A1* | 2/2014 | Sheive ............... G06F 8/30 717/110 |
| 2014/0289650 | A1 | 9/2014 | Cotlarciuc |
| 2014/0304682 | A1 | 10/2014 | Taylor et al. |
| 2014/0331317 | A1* | 11/2014 | Singh ............... G06F 21/52 726/22 |
| 2015/0077326 | A1* | 3/2015 | Kramer ............... G06F 3/0325 345/156 |
| 2015/0135214 | A1 | 5/2015 | Reisman |
| 2016/0004391 | A1 | 1/2016 | Cotlarciuc |
| 2016/0080523 | A1* | 3/2016 | Sethi ............... H04L 67/12 706/12 |
| 2016/0092176 | A1* | 3/2016 | Straub ............... G06F 3/0486 717/107 |
| 2016/0103928 | A1 | 4/2016 | Glasgow et al. |
| 2016/0231881 | A1* | 8/2016 | Sirpal ............... G06F 3/0482 |
| 2016/0313882 | A1 | 10/2016 | Brown et al. |
| 2017/0017391 | A1* | 1/2017 | Mattson ............... G06F 16/957 |
| 2017/0090734 | A1* | 3/2017 | Fitzpatrick ............ G06F 40/109 |
| 2017/0102830 | A1 | 4/2017 | Wehrman et al. |
| 2017/0228467 | A1* | 8/2017 | Bailly ............... H04L 67/34 |

OTHER PUBLICATIONS

"Final Office Action", U.S. Appl. No. 14/853,197, dated Apr. 27, 2018, 19 pages.
"First Action Interview Office Action", U.S. Appl. No. 14/853,197, dated Dec. 15, 2017, 21 pages.
"Non-Final Office Action", U.S. Appl. No. 12/502,486, dated Mar. 6, 2012, 10 pages.
"Non-Final Office Action", U.S. Appl. No. 12/502,486, dated Oct. 21, 2014, 11 pages.
"Non-Final Office Action", U.S. Appl. No. 14/878,369, dated Oct. 18, 2017, 15 pages.
"Notice of Allowance", U.S. Appl. No. 12/502,486, dated May 11, 2015, 14 pages.
"Notice of Allowance", U.S. Appl. No. 14/878,369, dated May 10, 2018, 8 pages.
"Pre-Interview First Office Action", U.S. Appl. No. 14/853,197, dated Nov. 1, 2017, 20 pages.
Taylor, "System and Method for Authoring a Web Page to be Run-Time Editable", U.S. Appl. No. 11/951,177, filed Dec. 5, 2007, 40 pages.
Taylor, "Systems and Methods for Run-Time Editing of a Web Page", U.S. Appl. No. 11/951,165, filed Dec. 5, 2007, 42 pages.
"Final Office Action", U.S. Appl. No. 14/853,197, dated Feb. 28, 2019, 19 pages.

* cited by examiner

INTER-CONTEXT COORDINATION TO FACILITATE SYNCHRONIZED PRESENTATION OF IMAGE CONTENT

RELATED APPLICATIONS

This Application claims priority as a continuation under 35 U.S.C. 120 to U.S. patent application Ser. No. 14/878,369, filed Oct. 8, 2015, and titled "Inter-context coordination to facilitate synchronized presentation of image content," the entire disclosure of which is hereby incorporated by reference.

BACKGROUND

People use tablet, notebook, and desktop computers to create and refine many different types of electronic files. Examples of electronic file types include written documents, slide decks, sales brochures, web pages, photos, videos, program code, program graphics, general audio/visual presentations, and so forth. Accordingly, these different types of electronic files may have different kinds of content, such as textual content, image content, animation content, passive content, or executable content. Additionally, content included in an electronic file may be static or have a dynamically-changing aspect, e.g., through use of an interactive graphic, a flashing banner, a Graphics Interchange Format (GIF) item, or an executable script.

A multitude of applications have been developed to accommodate the various kinds of content as well as the different types of electronic files. Typically, conventional applications include modules that are specially designed to work with one or a small subset of the different kinds of content that are found in electronic files. A picture application, for example, may be designed to help people modify photographic content. Hence, a picture application includes an image-oriented module that is adept at working with photographic content, such as to help refine or enhance a photographic image.

As a result of this fragmented and specialized approach to application development, conventional application architecture is often burdened by a singular or independent programming strategy that results in modules that are tightly integrated with the applications of which the modules form a part. Unfortunately, it is therefore difficult to isolate a module from one application for inclusion in another application. For instance, in conventional application architectures an image-oriented module that is built into a picture application is not able to be reused as a module forming a part of a website design application. Consequently, the efforts invested to create an image-oriented module with powerful image-editing tools are not leveraged in conventional architectures across different applications or spread over multiple product lines, which is both inefficient and costly.

In a conventional application development environment in which multiple programming technologies are available for use in building an application, such as both web and native programming technologies, an independent application is likely to be built as a web application that runs entirely within a web browser or as a native application that runs in a stand-alone manner. Modules in such independent applications suffer from the lack of portability resulting from conventional integrated application architecture as discussed above. To address this lack of module portability, a hybrid application architecture may be adopted that leverages multiple programming technologies.

A hybrid application incorporates, for example, both web-based coding and native-based coding. Web-based coding includes HyperText Markup Language (HTML) and JavaScript web browser user interface (UI) technologies. Native-based coding includes native desktop or mobile computing platform UI technologies. A web-native hybrid application may therefore be implemented to include a web-coded module and a native-coded module. Separating functionality into different modules in a hybrid application makes reuse of this functionality possible, which reuse is not available in the same manner with conventional application architectures. Unfortunately, different modules corresponding to different technologies or functionalities do not typically interoperate well together within a given hybrid application. Consequently, execution speed of a hybrid application may be slowed to an extent that it becomes noticeable to a user. For example, providing on-screen UI feedback in response to user commands may be noticeably delayed, which creates a frustrating user experience (UX) and slows a user's productivity.

SUMMARY

Inter-context coordination is described to facilitate synchronized presentation of image content. In one or more example implementations, inter-context coordination is facilitated between two or more execution contexts, such as a process or a thread. A first execution context is responsible for controlling pixels of first image content, and a second execution context is responsible for controlling pixels of second image content. An inter-context coordination module is configured to synchronize presentation of the first image content and the second image content based on a coordination policy that is proactively established by the first execution context or the second execution context to handle future user interaction. The coordination policy may be dynamically updated by an execution context responsive to changes to image content.

In an example process-oriented embodiment, an application generates a first process that is responsible for user interaction with respect to a first logical window and a second process that is responsible for user interaction with respect to a second logical window. The application further includes an inter-context communication mechanism that is associated with an inter-context coordination module and that enables the first process and the second process to implement at least one coordination policy to coordinate the handling of user interactions.

The inter-context communication mechanism enables the second process to establish at least one stipulation for the coordination policy, with the stipulation being accessible by the first process. A stipulation is indicative of which process is to handle a response to a given user input event. For example, a stipulation may be implemented as a rule indicative of a routing destination for a user input event or may be implemented as a grant indicative of which process is authorized to manipulate a group of pixels in a logical window of another process. The first process then analyzes a user input event with regard to stipulations of the coordination policy to determine an appropriate routing or an existing authorization that pertains to the user input event. Stipulations may be added, removed, or changed dynamically by the second process. For instance, a stipulation may be altered in response to a change to image content displayed in the second logical window.

In one or more example implementations, a coordination policy is realized as an event routing policy or as a pixel authorization policy. In an example event routing policy, the second process proactively conveys to the first process one or more event routing rules that specify one or more criteria under which a user input event is to be conveyed to the second process for handling. An event routing rule may be a location-based event routing rule that specifies a screen or window location of an operating system event, or an event routing rule may be a key-based event routing rule that specifies at least one key that is pressed as an operating system event. For an example pixel authorization policy, the second process proactively conveys to the first process one or more pixel authorization grants that specify one or more criteria under which the first process is empowered to manipulate a group of pixels drawn by the second process in the second logical window without requesting permission. A pixel authorization grant may be an object-based pixel authorization grant that identifies pixels using a handle or an area-based pixel authorization grant that identifies pixels by specifying a group of pixels on the display screen.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the discussion.

DETAILED DESCRIPTION

Overview

Figure 1:
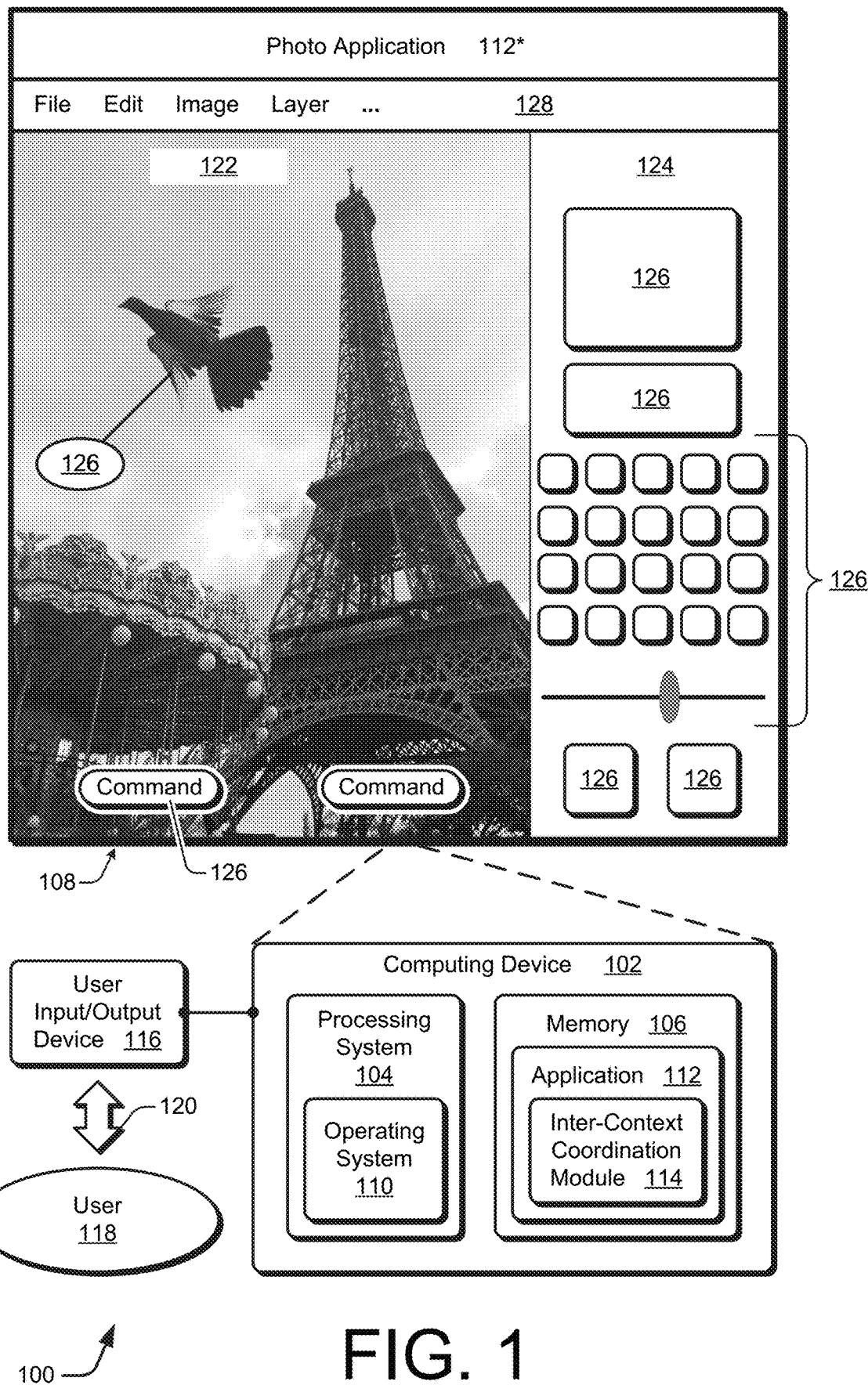
FIG. 1 illustrates an environment for example implementations that are operable to employ techniques described herein that relate to inter-context coordination to facilitate synchronized presentation of image content.

Hybrid applications combine any two or more of many different types of programming technologies. A hybrid application may combine, for example, a web programming technology and a native programming technology using a web-coded module and a native-coded module, respectively. In an example of a web-native hybrid application, a web-based process corresponding to the web-coded module draws a user interface (UI). The web-based process shares a visual window with a separate native-based process corresponding to the native-coded module. The native-based process is responsible for implementing performance-sensitive non-UI functionality. For example, a web-native hybrid application may be implemented for situations in which a core piece of technology (e.g., a photo-oriented module's canvas or compositing engine) can be beneficially used or reused with multiple UIs. These UIs may be created in a number of different ways. For instance, one UI may be implemented in a web-based manner, and another UI may be implemented using the Touch framework by Microsoft® Corporation. In a UI-related hybrid environment, a core computing technology may be packaged as a single binary running in its own process, and different UI modules may then be built that run in their own processes while interacting with the process of the core computing technology.

In an example operation of a hybrid application, the hybrid application may generate two separate processes: one that is latency-sensitive and processing intensive and one that is less latency-sensitive and provides a UI overlay. For purposes of explanation, the latency-sensitive and processing intensive process is discussed in terms of being a native process that may be run in a stand-alone manner, and the UI overlay process is discussed in terms of being a web-based process that may be run in a web browser. With such a hybrid application, the two separate processes share a portion of a display screen that is defined or delineated by an operating system as a visual window in a manner that is visually-perceptible to a user. For example, a visual window may be bounded by a visible border that is drawn by the operating system. To interact with the hybrid application, a user provides input via a user input device, such as a touch screen, a mouse, a trackpad, or a keyboard. The user input device produces a user input event, such as a key event or a pointer event, and the operating system detects the user input event. If the user input event corresponds to a visual window of the hybrid application, the operating system is responsible for providing an indication of the user input event to the hybrid application. Unfortunately, problems arise with respect to handling user input events as a result of multiple processes sharing the visual window of the hybrid application.

The problems relate to providing UI feedback in response to user input events if two different processes of a hybrid application are responsible for displaying pixels in the visual window. As used herein, "responsible for displaying pixels" includes selecting, determining, or controlling a color of the pixels being displayed to represent some visual content. The hybrid application permits each process to control the display of pixels in a corresponding logical window, which logical windows are part of the visual window of the hybrid application but may not be visible to the user. In this example, the web process corresponds to a UI logical window, and the native process corresponds to working logical window. The working logical window depicts file content that is being worked on by a user, such as photographic content that is being edited. The web process draws UI items, such as tools for editing photographic content, in the UI logical window, which is positioned so as to at least partially overlap the working logical window.

A first problem arises because there is not a single process associated with the hybrid application to which an indication of a user input event may be automatically routed. In other words, for a web-native example, it is not readily apparent whether an operating system event for the visual window of the hybrid application should be routed to a web-based process or a native process, especially if the UI logical window is positioned over the working logical window. For certain visual window locations or at particular times, a given event should be routed to the web-based process, and for other visual window locations or at other times, the given event should be routed to the native process. If the operating system or one process takes time to determine which process should handle a user input event, such as by asking a process or incorrectly attempting to process the event, a delay occurs for responding to the user input event. The delay is discernable and distracting to the user and furthermore, the delay hinders the user's ability to be productive with the hybrid application.

A second problem arises if pixels displayed by one process are intended to be linked with pixels displayed by another process. Consider an example in which the native process is displaying pixels of a photographic image in a canvas area of the working logical window, and a portion of the photographic image has recently been modified. The web-based process places pixels for an explanatory popover icon in the UI logical window over the recently-modified portion of the photographic image so as to annotate the modification. If a user then changes a view of the canvas by requesting that the photographic image be scrolled upwards, the scrolling user input event is handled by the native process in the working logical window to rapidly reflect the image view change that is desired be the user. However, the popover icon is therefore left behind in the UI logical window and appears to the user to be effectively relocated to be over a different, incorrect portion of the canvas image, which is confusing to the user and destroys the illusion of a physical interaction metaphor that is expected with a non-hybrid application. The native process could instead wait to respond to the scrolling user input event until a negotiation is completed with the web-based process to determine how to handle the presence or relocation of the pixels forming the popover icon. Unfortunately, the delay resulting from the negotiation creates a user-discernable lag-time between the request for the scrolling operation and implementation thereof that is aggravating to the user.

In one or more example implementations, inter-context coordination is facilitated between two or more processes that respectively correspond to two or more logical windows that share a visual window of an application, such as a hybrid application. An inter-context communication mechanism enables inter-context coordination to occur prior to detection of a user input event. Consequently, user-discernable delays in responding to user input events may be reduced or even avoided entirely by proactively determining how the user input events are to be handled with regard to two or more processes. The inter-context communication mechanism enables first and second processes to implement at least one coordination policy to coordinate the handling of user interactions. A stipulation may be established for the coordination policy with the stipulation representing an agreement between the first and second processes regarding how to handle or who is to handle future user input events.

In an example implementation, the inter-context communication mechanism is configured to enable the second process to establish at least one stipulation for the coordination policy, with the stipulation being accessible by the first process. The stipulation is indicative of which process is to handle a response to a given user input event. For example, a stipulation may be implemented as a rule indicative of which process a user input event should be routed for handling depending on a window location of pointer event or a character of a key event. In this case, a user input event received from an operating system is routed to the appropriate process without introducing a user-perceptible delay while the user input event is analyzed in detail or partially implemented by the wrong process. As another example, a stipulation is implemented as a grant indicative of which process is authorized to manipulate a group of pixels in a logical window of another process. In this case, the first process is authorized by the second process to erase or move pixels drawn by the second process if the handling of an incoming user input event by the first process is going to adversely affect the meaning of the pixels drawn by the second process or otherwise adversely impact a user experience (UX).

A particular process, such as the first process, is configured to analyze a user input event with regard to stipulations of the coordination policy to determine an appropriate routing or an existing authorization. Stipulations may be dynamically updated as an application executes. For example, if a web-based process changes pixels in the UI logical window, such as by adding an explanatory popover icon or moving a toolbar overlay, the web-based process can provide a new or updated stipulation for the coordination policy. Thus, stipulations afford an opportunity to plan for the handling of future user input events using a coordination policy of an inter-context coordination mechanism. In these manners, proactive inter-context coordination enables processes to respond to incoming user input events with less delay so as to enable the expeditious updating of image content in accordance with the user input events, further description of which is included in the following sections.

In the following discussion, after some example terminology is set forth, an example environment is described that may employ the inter-context coordination techniques described herein. Example embodiment systems and machines and example embodiment procedures and processes are then described that may be performed in the example environment as well as in other environments. Consequently, performance of the example procedures is not limited to the example environment, and the example environment and systems are not limited to performance of the example procedures.

Terminology Examples

In one or more examples, the term "application," as used herein, refers to a computer program that may be interpreted or compiled. Examples of an application may include, but are not limited to, a word processing application, a photo editing application, a browser application, a desktop application, a tablet or smartphone application, a spreadsheet application, a game application, or a website or game development application. An application may include or produce one or more execution contexts and may be associated with a visual window.

In one or more examples, the term "execution context," as used herein, refers to an entity that is recognized by an operating system as being independent or as having a designated private memory space along with other resources assigned by the operating system. An execution context may include, for example, a current value of hardware registers, a program counter, access to one or more hardware resources—such as file handlers on external media, and so forth. Examples of an execution context may include, but are not limited to, a process or a thread. An application may generate multiple processes, and a process may spawn multiple threads.

In one or more examples, the term "visual window," as used herein, refers to a visible region of a display denoted by a UI element that is produced at least partially by an operating system for an application. A visual window may be provided with one or more borders that are user-perceptible to delineate an area that corresponds to the application on a display screen. In contrast, the term "logical window," as used herein for one or more examples, refers to space on a display or virtual desktop with the space corresponding to an application, or a portion thereof such as an execution context. A logical window is known to an operating system, but the logical window may not be delineated in a manner that is perceptible to a user. A logical window may be constrained to the borders of a visual window or may otherwise be associated with a visual window.

In one or more examples, the term "user interaction," as used herein, refers to user input interaction or user output interaction. Examples of user input interaction may include, but are not limited to a key event resulting from a key press of a keyboard; a location or pointer event resulting from use of a mouse, a touchpad, a touch screen, or a trackball; gesture input detected by a touchscreen, a touchpad, or a camera; or voice input detected by a microphone. Examples of user output interaction may include, but are not limited to, presentation of image content on a display screen or with a projector, adjustment to image content responsive to user input interaction, or sound output from a speaker.

In one or more examples, the term "coordination policy," as used herein, refers to one or more stipulations made by one execution context for access or consumption by another execution context. In one or more examples, the term "stipulation," as used herein, refers to an expressed condition or situation that may include at least one criterion indicative of if the stipulation is relevant or how the stipulation is to be applied. Establishment of a stipulation proactively prepares for handling a particular user interaction that may occur in the future after the stipulation is established as part of the coordination policy. A coordination policy enables two or more execution contexts to coordinate efforts to respond to or to provide for user interaction. Examples of a coordination policy may include, but are not limited to, an event routing policy or a pixel authorization policy. Examples of a stipulation may include, but are not limited to, an event routing rule or a pixel authorization grant.

In one or more examples, the term "inter-context communication mechanism," as used herein, refers to one or more capabilities to establish a stipulation for a coordination policy that facilitates inter-context coordination. An inter-context communication mechanism may include a capability to convey a stipulation from one execution context to another execution context or a capability to insert a new criterion or modify an existing criterion. The inter-context communication mechanism may also include a capability for one execution context to access a coordination policy controlled or provided by another execution context.

In one or more examples, the term "event routing policy," as used herein, refers to a policy to facilitate inter-context coordination that includes one or more event routing rules that indicate which execution context is to handle a user input event received from an operating system. In one or more examples, the term "event routing rule," as used herein, refers to a rule having a criterion indicative of which execution context a user input event is to be routed if the user input event comports with the rule. Examples of an event routing rule may include, but are not limited to, a location-based event routing rule for pointer-type events or a key-based event routing rule for keyboard-type events.

In one or more examples, the term "pixel authorization policy," as used herein, refers to a policy to facilitate inter-context coordination that includes one or more pixel authorization grants that indicate if one execution context is authorized to manipulate pixels displayed by another execution context. In one or more examples, the term "pixel authorization grant," as used herein, refers to an authorization that is granted from one execution context to another execution context that enables the other execution context to manipulate an identified group of pixels displayed by the one execution context. Examples of a pixel authorization grant may include, but are not limited to, an object-based pixel authorization grant that identifies a group of pixels by a handle or an area-based pixel authorization grant that identifies a group of pixels using one or more pixel coordinates or an area of a screen or virtual desktop.

In one or more examples, the term "user input event," as used herein, refers to user input interaction that is detected by an operating system. An indication of a user input event that describes one or more characteristics of the user input event may be provided to an execution context of an application. Examples of a user input event may include, but are not limited to, a key event resulting from a key press of a keyboard; a location or pointer event resulting from use of a mouse, a touchpad, a touch screen, or a trackball; gesture input detected by a touchscreen, a touchpad, or a camera; or voice input detected by a microphone.

In one or more examples, the term "convey," as used herein, refers to making information available to a given execution context, such as one execution context making information available to another execution context. Examples of a conveying may include, but are not limited to, passing, copying, transferring, identifying a memory location storing, giving access rights to, or some combination thereof information. The information may be, for instance, indicative of a user input event or a stipulated criterion of a coordination policy.

In one or more examples, the term "manipulate," as used herein, refers to causing a change or adaption to a group of pixels on a display screen. Examples of a manipulation may include, but are not limited to, erasing a group of pixels, changing an appearance of a group of pixels, relocating or moving a group of pixels, or some combination thereof.

In one or more examples, the term "image content," as used herein, refers to pixels that are presented via a display screen or projector by an application or one or more execution contexts thereof that select or control a color of the pixels being presented. Examples of image content may include, but are not limited to, displayed subject-matter content, such as a photograph being refined, text being edited, a webpage being developed, a slide being prepared, etc.; displayed UI items, such as buttons, sliders, popovers, drop-down menus, etc.; or some combination thereof.

Also, unless context dictates otherwise, use herein of the word "or" may be considered use of an "inclusive or," or a term that permits inclusion or application of one or more items that are linked by the word "or" (e.g., a phrase "A or B" may be interpreted as permitting or being relevant to just "A," to just "B," or to both "A" and "B").

Example Environment

FIG. 1 is an illustration of an environment 100 for one or more example implementations that are operable to employ techniques described herein that relate to inter-context coordination to facilitate synchronized presentation of image content. As illustrated, the example environment 100 includes at least one computing device 102, at least one display device 108, at least one user input/output (I/O) device 116, and at least one user 118. FIG. 1 also depicts user interaction 120 between the user 118 and the user I/O device 116 or the display device 108.

The computing device 102 may be implemented as any suitable type of computing device. Examples of end-user implementations for the computing device 102 include, but are not limited to, a desktop computer, a laptop or notebook computer, a mobile device (e.g., assuming a handheld configuration such as a tablet, a mobile phone, or a phablet), a mobile device coupled to a separate screen, an entertainment appliance such as a smart television, a game console, a device configured to receive gesture input, a device configured to receive speech or video input, a device configured to provide 2D or 3D image output, a device configured to provide sound output, a wearable computing device such as a smart watch or intelligent glasses, or some combination thereof. Thus, an end-user implementation of the computing device 102 may range from relatively high-resource devices with substantial memory and processor resources (e.g., personal computers or game consoles) to relatively low-resource devices with constrained memory or processing resources (e.g., mobile devices such as wearables). Examples of data center or server device implementations for the computing device 102 include, but are not limited to, a web server, a server running open source software, a server of a proprietary design, a stand-alone server, a server blade, an allocated portion of a server farm, server functionality that is distributed across at least one data center, or some combination thereof.

The computing device 102 is illustrated as including a variety of hardware components, examples of which include: a processing system 104, an example of a computer-readable storage medium illustrated as memory 106, and so forth. Other hardware components are also contemplated as further described herein below with particular reference to FIG. 10. The processing system 104 is representative of functionality to perform operations through execution of instructions stored in the memory 106. Although illustrated separately, functionality of these components may be further divided, combined (e.g., on an application specific integrated circuit (ASIC)), and so forth. Examples of a user I/O device 116 include, but are not limited to, a keyboard, a mouse, a touchpad, a touch screen, a microphone, a camera, the display device 108, a speaker, or some combination thereof. The user I/O device 116 or the display device 108 may be separate from, or integrated with, the computing device 102.

The computing device 102 is further illustrated as including an operating system 110. The operating system 110 is configured to abstract underlying functionality of the computing device 102 to the application 112 that is executable on the computing device 102. For example, the operating system 110 may abstract the processing system 104, the memory 106, the display device 108, the user I/O device 116, or other functionality of the computing device 102 such that the application 112 may be written without knowing "how" this underlying functionality is specifically implemented. The application 112, for instance, may provide data to the operating system 110 to be rendered and displayed by the display device 108 without understanding how this rendering will be performed, or the application 112 may receive from the operating system 110 data indicative of a user input event without knowing how the user I/O device 116 acquired the data. The operating system 110 may also represent a variety of other functionality, such as management of a file system or control of a user interface (UI) that is navigable by the user 118 of the computing device 102.

For one or more example implementations, an inter-context coordination module 114 is located at or executing on the computing device 102, such as by being part of the application 112. The inter-context coordination module 114 represents functionality to implement techniques for inter-context coordination to facilitate synchronized presentation of image content as described herein. The inter-context coordination module 114 may be implemented as a software package that executes on and specially configures one or more processors; as a hardware apparatus; or using a combination of software, hardware, firmware, or fixed logic circuitry; with some combination thereof; and so forth.

During execution, the application 112 causes pixels to be displayed on the display device 108 with desired colors. By way of example only, the application 112 may be implemented as a photo application 112* as shown. The operating system 110 generally constrains the pixels of the photo application 112* to a particular visual window. Within the visual window, the photo application 112* may include a menu area 128. As shown, the menu area 128 is implemented as a menu row that includes the following menu options: "File," "Edit," "Image," "Layer," and so forth. The displayed image content includes multiple items. For the sake of descriptive clarity, the displayed image content is separated roughly into two zones: a canvas zone 122 and a UI zone 124. The zones may be distinct from one another or may fully or partially overlap each other. Image content may be displayed in the canvas zone 122 or in the UI zone 124 as individual pixels or amalgamations of pixels that may have semantic meaning to the user 118.

In example implementations, the user 118 is empowered to affect image content, as well as other aspects, of the canvas zone 122 and the UI zone 124 via the user I/O device 116 as represented by the user interaction 120. The user interaction 120 may include user input as the user 118 operates a keyboard, a mouse, etc. or may include user output as the user 118 is exposed to images via the display device 108, to sounds via a speaker, etc. For a situation with the photo application 112*, a photograph occupies a substantial portion of the canvas zone 122 as shown. Different UI items 126 occupy parts of the UI zone 124. UI items 126 of the UI zone 124 may include, but are not limited to, a color chart, buttons, a slider, dials, selection tool indicators, or some combination thereof.

UI items 126 may further be temporarily, permanently, automatically, responsively, selectively, etc. drawn over the photograph in the canvas zone 122. Examples of the UI items 126 that may occupy part of the canvas zone 122 include the "Command" buttons in the lower part of the canvas zone 122, a popover indicator linked to a bird that is part of the photograph, and so forth. Various types of UI items 126 may be presented at alternative positions around the window for the photo application 112* that differ from those that are shown.

In example implementations, a first execution context, such as a native execution context, is responsible for handling user interaction, including input or output aspects of the user interaction 120, for the canvas zone 122. A second execution context, such as a web-based execution context, is responsible for handling user interaction, including input or output aspects of the user interaction 120, for the UI items 126. Such UI items 126 may include those located in the canvas zone 122 or those located in the UI zone 124. To facilitate cooperation between the first execution context and the second execution context, the inter-context coordination module 114 implements one or more techniques or systems as described herein for inter-context coordination to facilitate synchronized presentation of image content.

Having considered an example environment, consider now a discussion of some example details of the systems or techniques for facilitating inter-context communication to enable inter-context coordination so as to expedite the displaying and updating of image content of different processes in accordance with one or more embodiments.

Figure 2A:
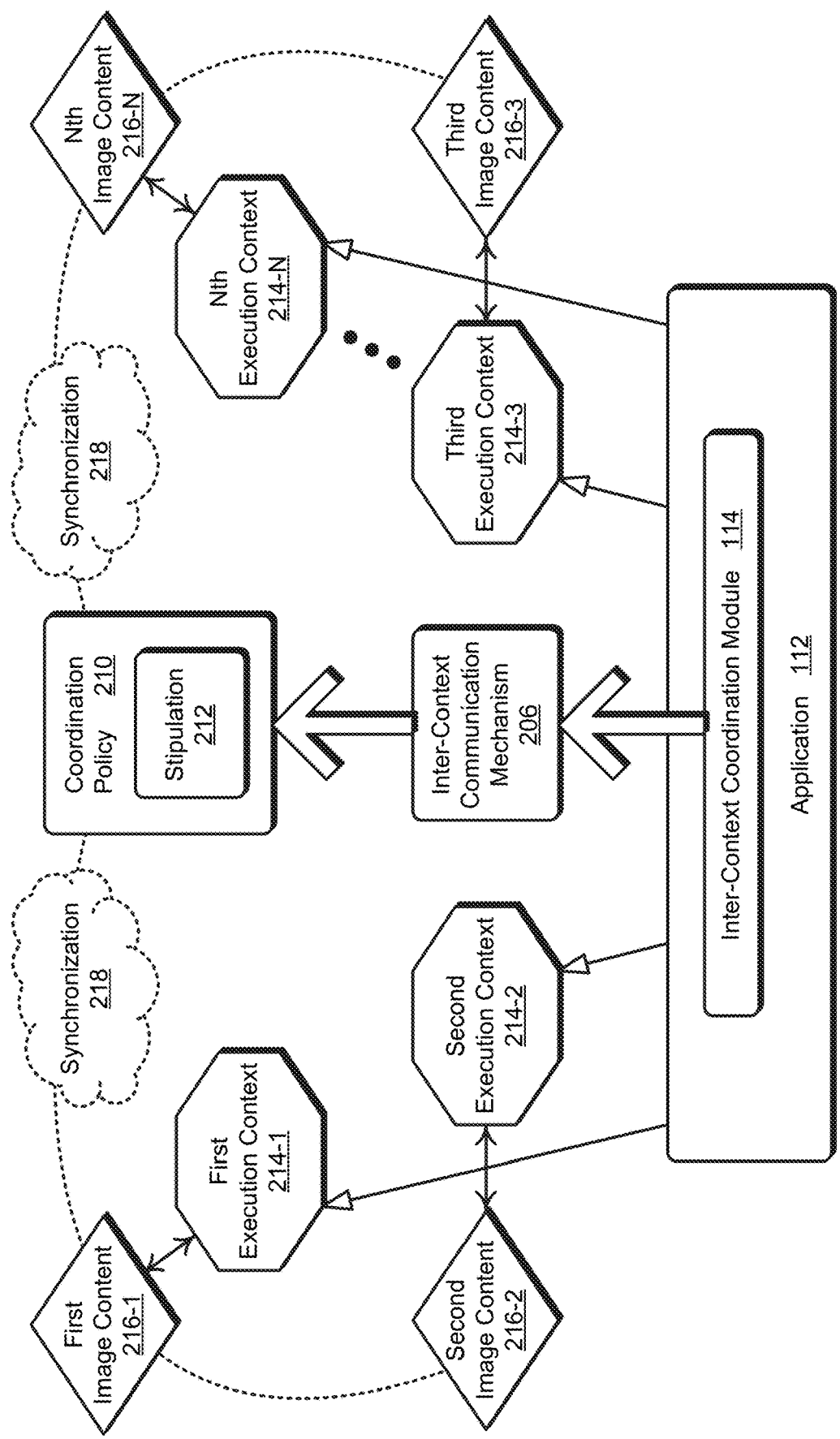
FIG. 2A depicts an example system having an inter-context communication mechanism and in which multiple execution contexts of an application are respectively associated with image content that is synchronized for display.
Figure 2B:
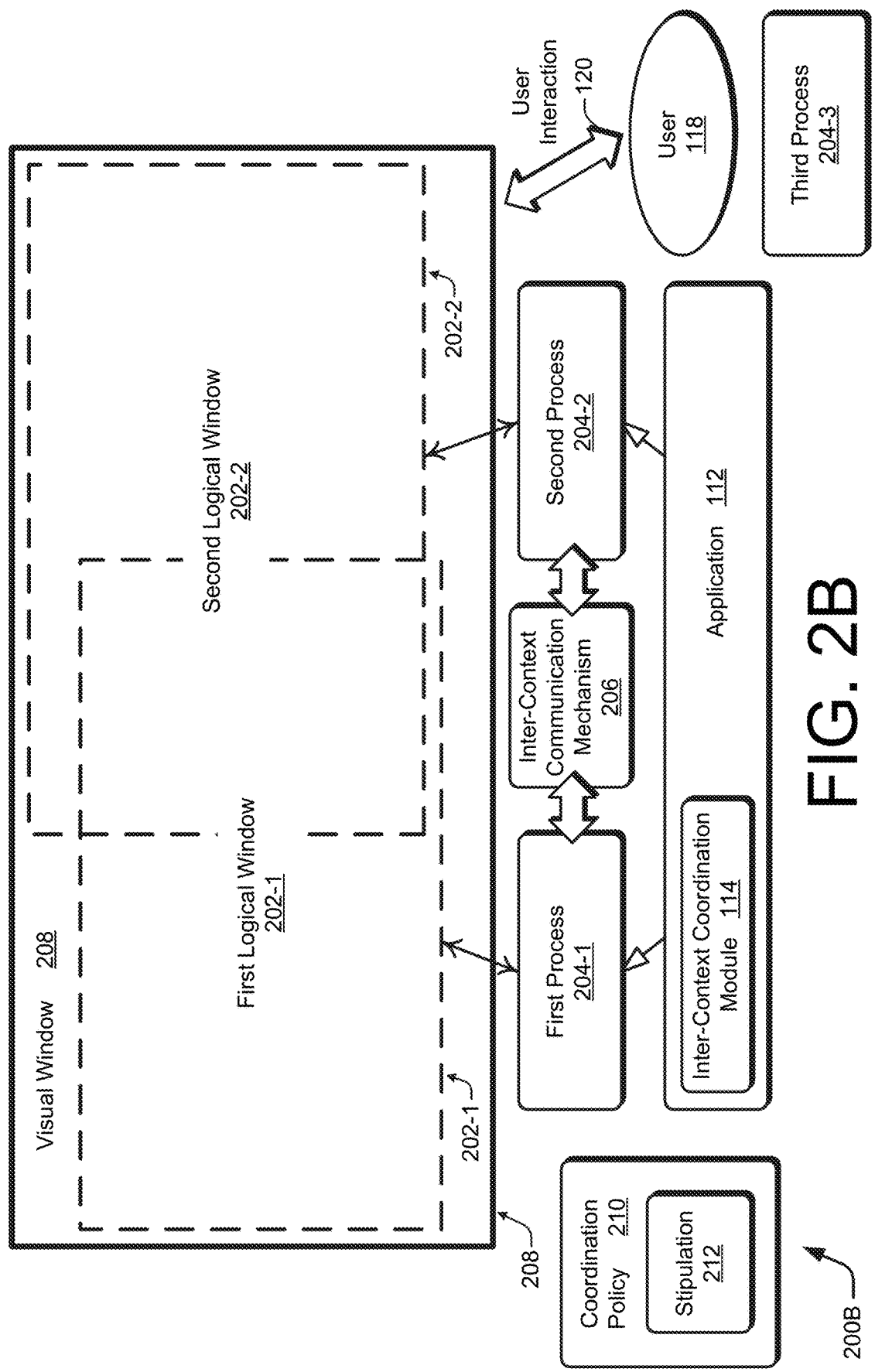
FIG. 2B depicts an example system having an inter-context communication mechanism and in which a first process and a second process of an application are respectively associated with a first logical window and a second logical window.
Figure 3:
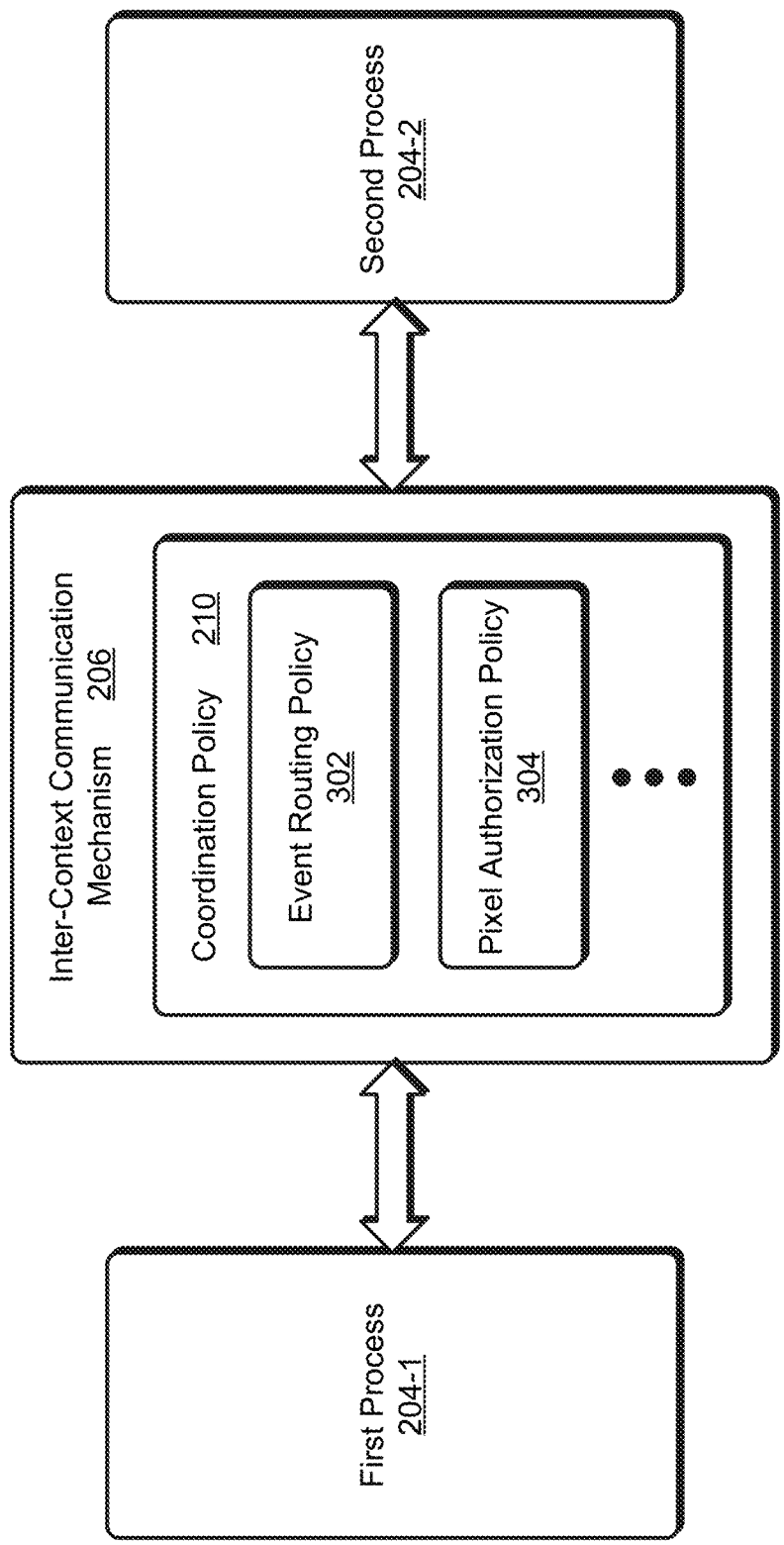
FIG. 3 depicts an example inter-context communication mechanism that implements one or more coordination polices, such as an event routing policy or a pixel authorization policy.
Figure 4:
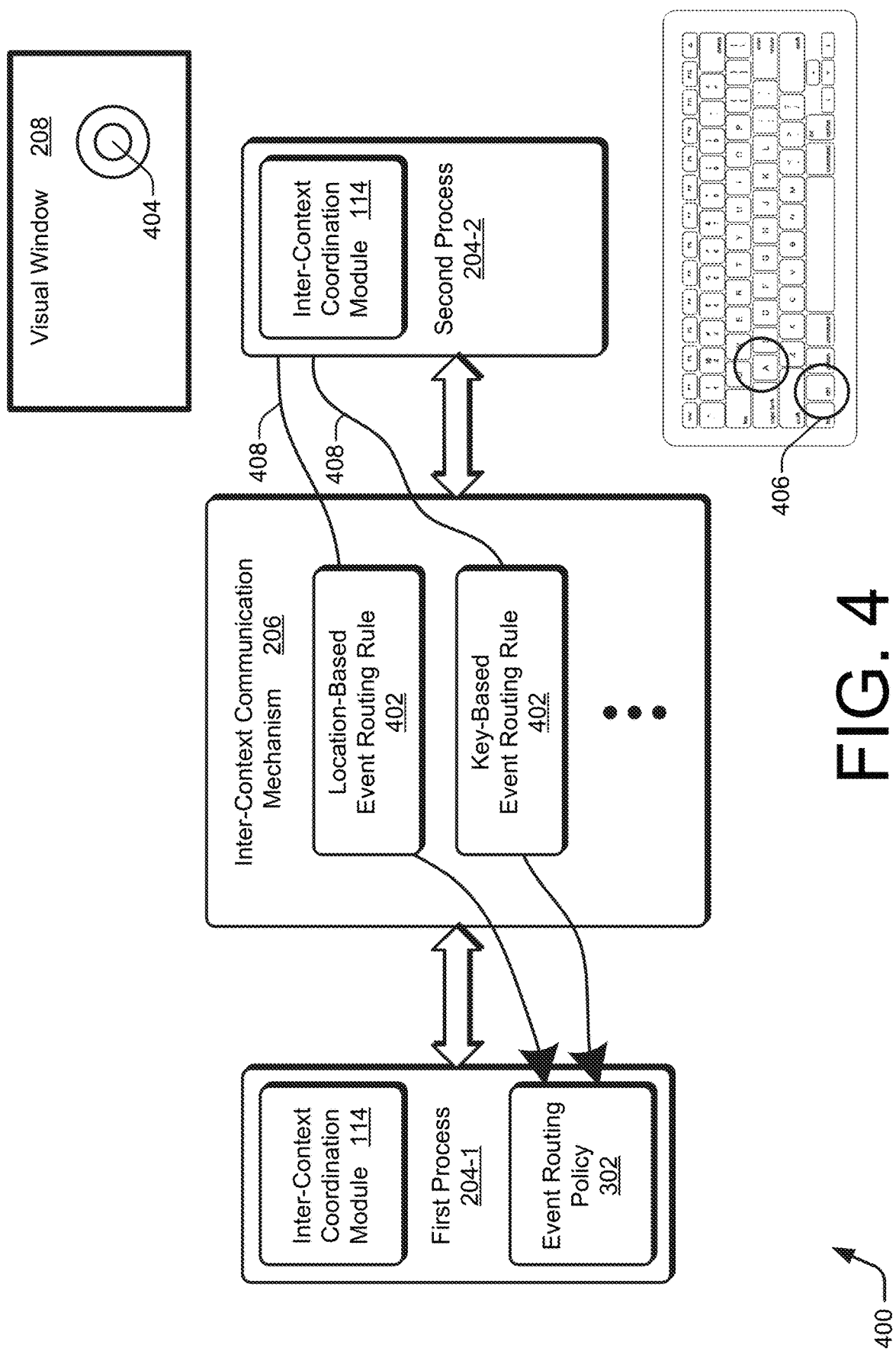
FIG. 4 illustrates an example scheme for establishing an event routing policy.
Figure 5:
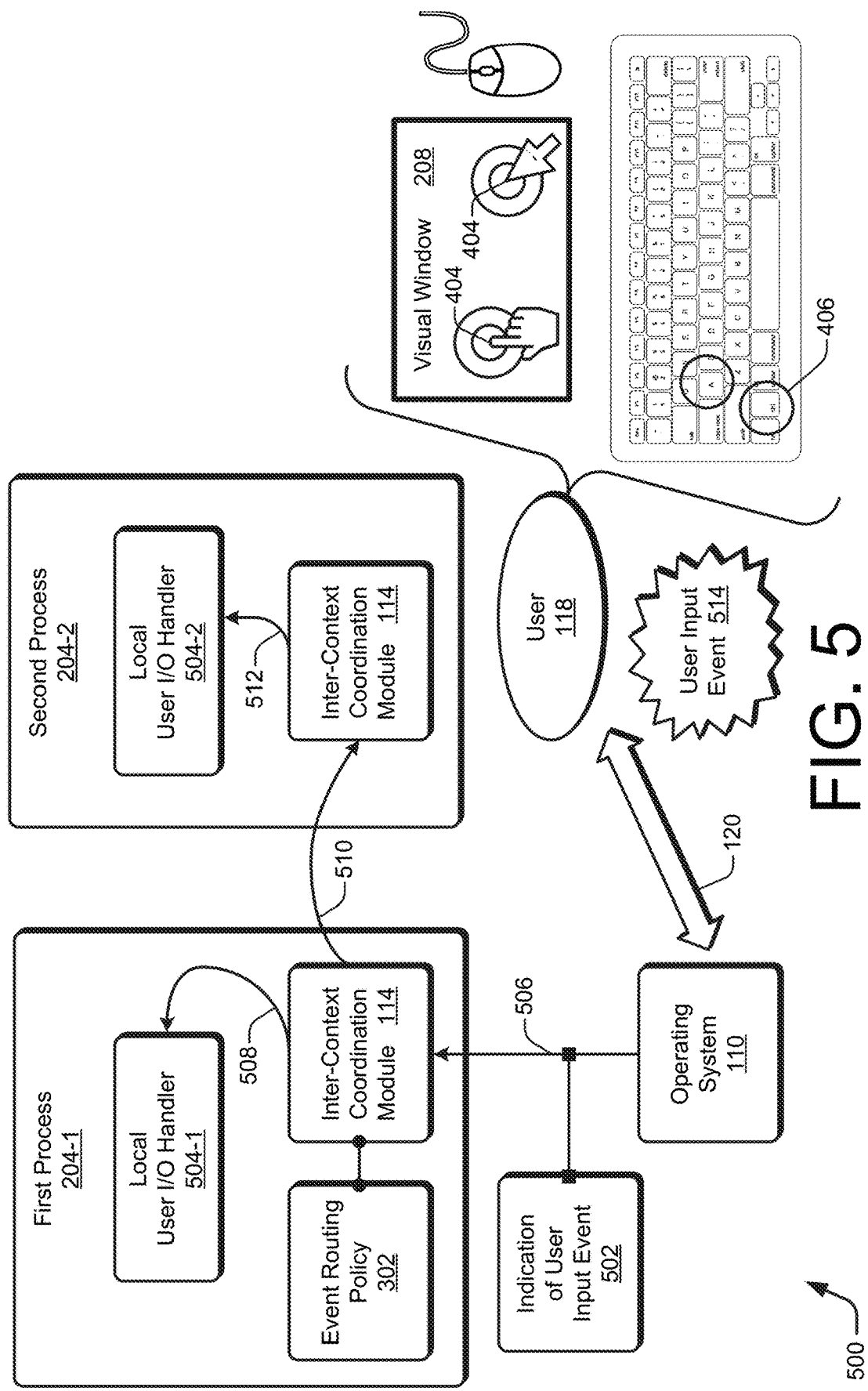
FIG. 5 illustrates an example technique for utilizing an event routing policy to facilitate inter-context coordination.
Figure 6:
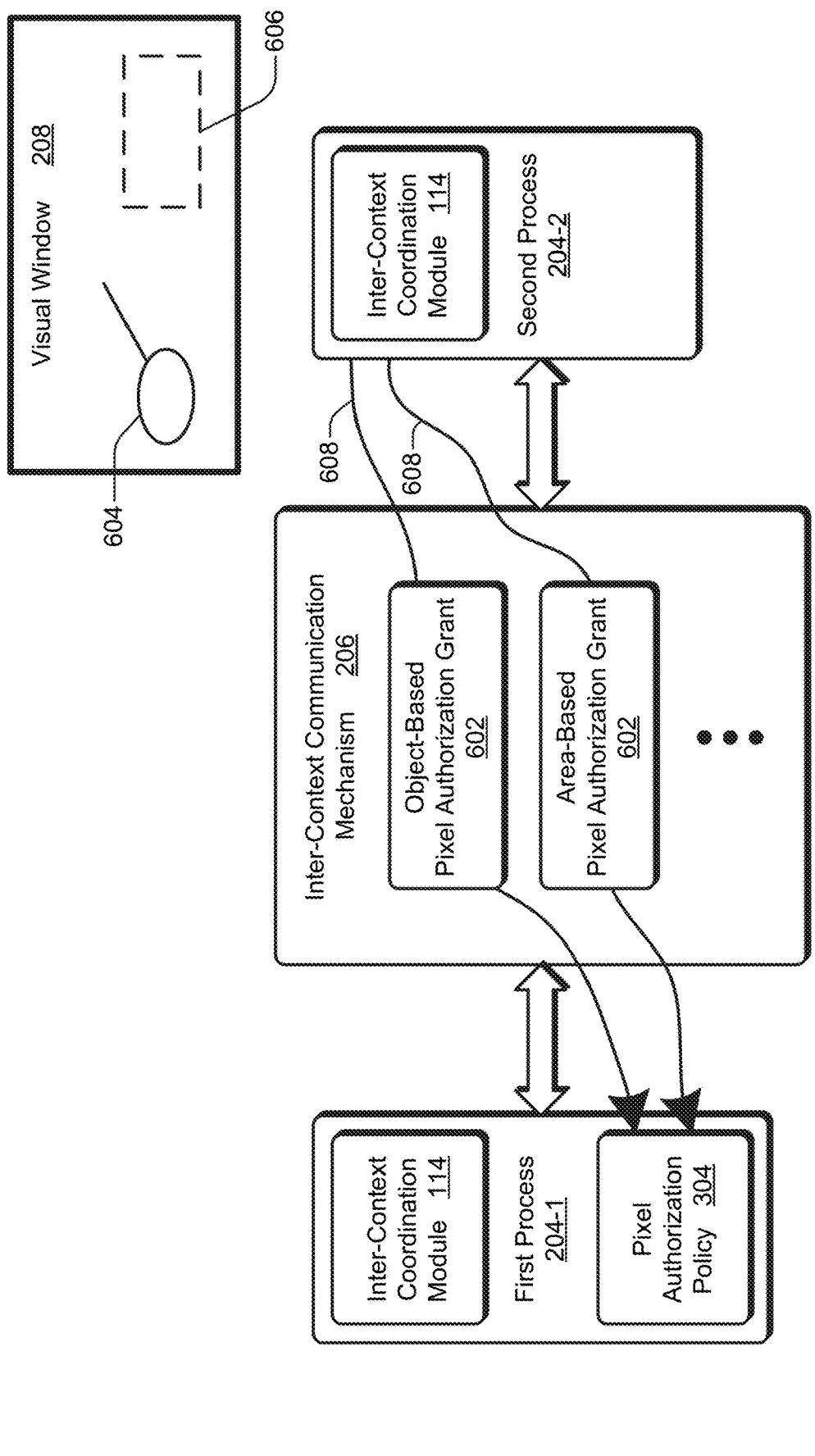
FIG. 6 illustrates an example scheme for establishing a pixel authorization policy.
Figure 7:
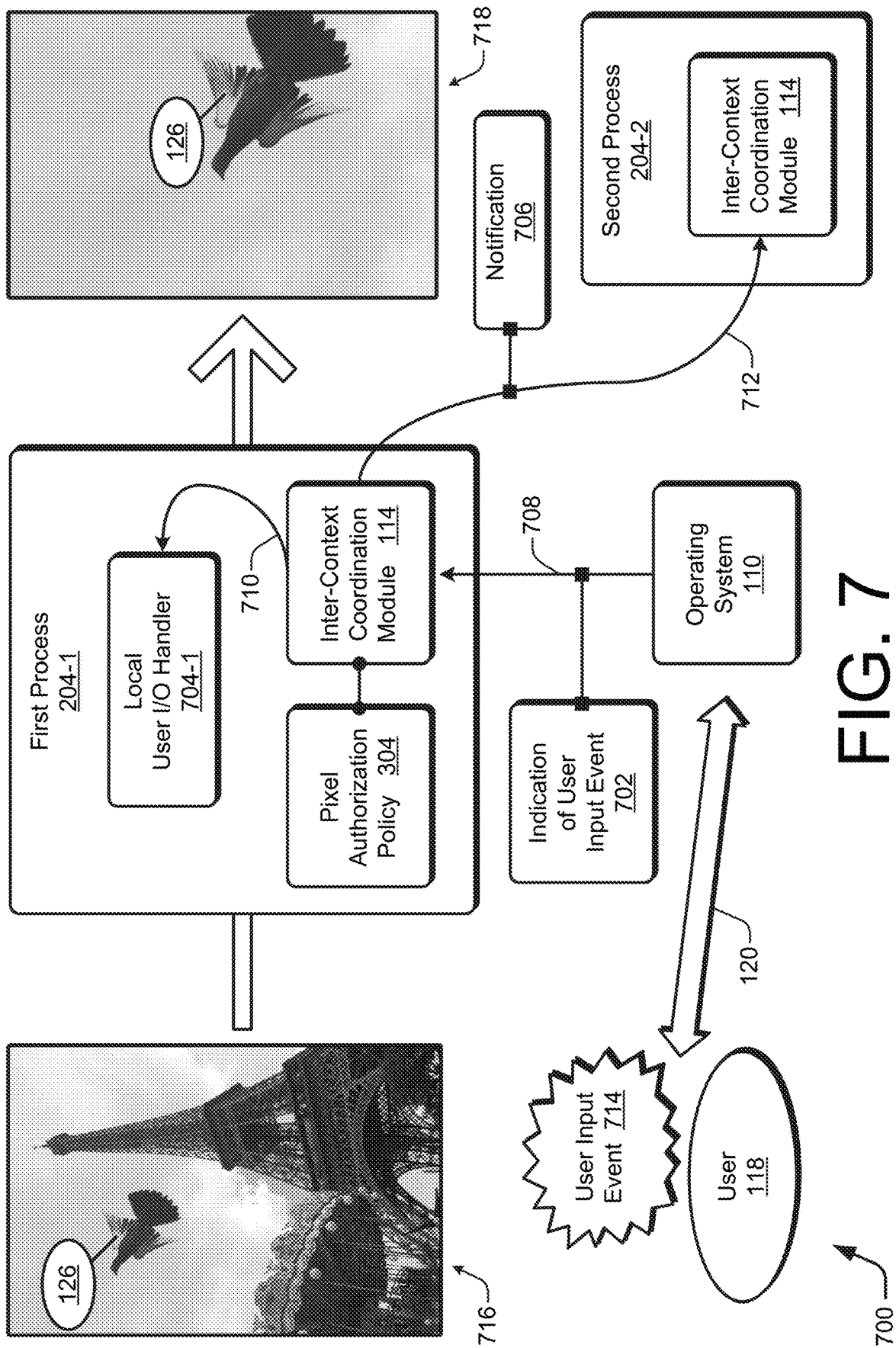
FIG. 7 illustrates an example technique for utilizing a pixel authorization policy to facilitate inter-context coordination.

Inter-Context Coordination to Facilitate
Synchronized Presentation of Image Content This section describes some example details of systems or techniques in a digital environment for inter-context coordination to facilitate synchronized presentation of image content in accordance with one or more implementations. FIG. 2A depicts an inter-context communication mechanism and an example relationship between multiple execution contexts of an application with regard to multiple instances of image content. FIG. 2B is an example of FIG. 2A and depicts a relationship between first and second processes of the application with regard to first and second logical windows. FIG. 3 depicts an example inter-context communication mechanism that implements one or more coordination polices, such as an event routing policy or a pixel authorization policy. FIGS. 4-5 are directed to example event routing policy implementations. FIGS. 6-7 are directed to example pixel authorization policy implementations.

FIG. 2A depicts an example system 200A having an inter-context communication mechanism 206 and in which multiple execution contexts 214 of an application 112 are respectively associated with image content 216 that is synchronized for display. As shown, there are "n" execution contexts 214, with "n" representing some integer: a first execution context 214-1, a second execution context 214-2, a third execution context 214-3, . . . and an nth execution context 214-n. Respectively corresponding to the "n" execution contexts 214 are "n" instances of image content 216: a first image content 216-1, a second image content 216-2, a third image content 216-3, . . . and an nth image content 216-n. The system 200A further includes an inter-context coordination module 114 and at least one coordination policy 210.

Each execution context 214 may be implemented as a process, a thread, and so forth. The multiple execution contexts 214-1 . . . 214-n may each be a process, may each be a thread, or may be a mixture of processes and threads. In one example, the first and second execution contexts 214-1 and 214-2 are first and second threads spawned by a single process or by separate processes. In another example, which is described further below with reference to FIG. 2B, the first and second execution contexts 214-1 and 214-2 are first and second processes generated by the application 112. In a two-execution-context scenario, the first execution context 214-1 may correspond to a native environment, and the second execution context 214-2 may correspond to a web environment.

In example embodiments, the system 200A is an asynchronous system having multiple independent execution contexts 214. Using at least one coordination policy 210 enables the creation of a synchronous façade over a system having inherently asynchronous subsystems, such as the execution contexts 214. The coordination policy 210 enables at least one execution context 214 to respond to events in a fast manner that appears to be synchronous to a user by facilitating a synchronization 218 between or among the multiple instances of image content 216-1 . . . 216-n by allowing execution contexts 214 to proactively communicate and plan for future user input events. If a synchronous request is received from a host operating system, the coordination policy 210 is used to formulate and present a response with a synchronized version of the image contents 216-1 . . . 216-n that respectively correspond to the multiple execution contexts 214-1 . . . 214-n.

The inter-context coordination module 114 is representative of functionality to establish, control, maintain, manage, or instantiate the inter-context communication mechanism 206. The inter-context communication mechanism 206 facilitates communication between the multiple execution contexts 214-1 . . . 214-n. Via inter-context communication, the multiple execution contexts 214-1 . . . 214-n are capable of implementing at least one coordination policy 210 to coordinate handling of user interaction to facilitate synchronized presentation of the multiple instances of image content 216-1 . . . 216-n. More specifically, the inter-context communication mechanism 206 is configured to enable the multiple execution contexts 214-1 . . . 214-n to establish or access at least one stipulation 212 for the coordination policy 210. Stipulations 212 are described further with reference to FIG. 2B.

FIG. 2B depicts an example system 200B in which a first process 204-1 and a second process 204-2 of an application 112 are respectively associated with a first logical window 202-1 and a second logical window 202-2. Although two logical windows 202 and three processes 204 are explicitly shown in FIG. 2B, the system 200B may include any number of logical windows 202 or processes 204. The system 200B further includes an inter-context communication mechanism 206, a visual window 208, and at least one coordination policy 210. As illustrated, FIG. 2B further depicts the user 118 and the user interaction 120. For the sake of clarity, and by way of example only, various aspects of inter-context coordination to facilitate synchronized presentation of image content are described herein with execution contexts 214 (of FIG. 2A) implemented as processes 204 and image content 216 implemented as logical windows 202 for FIGS. 2B-7. Thus, principles described herein with regard to processes or logical windows specifically are also applicable to execution contexts or image content generally.

The visual window 208 is displayed on the display device 108 (of FIG. 1) and is presented at least partially by the operating system 110 for the application 112 in a manner that is perceptible to the user 118. The application 112 generates the first process 204-1 and the second process 204-2. The first process 204-1 corresponds to the first logical window 202-1, and the second process 204-2 corresponds to the second logical window 202-2. Hence, the first process 204-1 is responsible for handling the user interaction 120 with respect to the first logical window 202-1, and the second process 204-2 is responsible for handling the user interaction 120 with respect to the second logical window 202-2. The first process 204-1, for instance, causes pixels to be displayed (e.g., with desired colors) via the first logical window 202-1. If a user input event for the user interaction 120 is directed to some of the pixels displayed via the first logical window 202-1, the first process 204-1 is generally charged with adjusting the color of pixels of the first logical window 202-1 responsive to the user input event.

The first logical window 202-1 and the second logical window 202-2 are associated with the visual window 208. In other words, the logical windows 202 are predominantly, if not entirely, contained within the visual window 208 that is associated with the application 112. The operating system 110 is aware of the logical windows 202, but the user 118 need not be. Although the first logical window 202-1 and the second logical window 202-2 are illustrated as at least partially overlapping each other in FIG. 2, these logical windows may instead be coextensive.

The inter-context communication mechanism 206 facilitates communication between the first process 204-1 and the second process 204-2. Via inter-context communication, the first process 204-1 and the second process 204-2 are capable of implementing at least one coordination policy 210 to coordinate handling of the user interaction 120. More specifically, the inter-context communication mechanism 206 is configured to enable the second process 204-2 to establish at least one stipulation 212 for the coordination policy 210 that is accessed by the first process 204-1 via the inter-context communication mechanism 206.

A stipulation 212 defines which process 204 is to handle a response to a given user input event. For example, the stipulation 212 may be implemented as a rule indicative of to which process a user input event should be routed, or the stipulation 212 may be implemented as a grant indicative of which process is authorized to manipulate a group of pixels in a logical window of another process. In operation, the first process 204-1, or a third process 204-3, is configured to analyze a user input event with regard to one or more stipulations 212 of the coordination policy 210 to determine an appropriate routing or an existing authorization that pertains to the user input event. Examples of a coordination policy 210 are introduced below with particular reference to FIG. 3 and discussed further with particular reference to FIGS. 4-7.

In an example implementation, a coding for the first process 204-1 may be web-based, and a coding for the second process 204-2 may be native to an executing computing device. Alternatively, the first and second processes 204-1 and 204-2 (or more processes) may correspond to parts of a hybrid application that are programmed with other, different coding technologies or that are programmed with a same coding technology. Inter-context coordination may be implemented if the programmed modules for different processes are built in different ways. For example, one program module may be part of a legacy system that is difficult to change substantially or significantly because the legacy module is expected to be consistent with previous iterations, and another program module may be a new or independent module that is easier to change and runs on top of the legacy module. Other usage scenarios, which may not involve a hybrid programming architecture, for implementing inter-context coordination to facilitate synchronized presentation of image content include: business reasons (e.g., cost of programming resources or access to relevant intellectual property), geography, temporal distance (e.g., sub-systems implemented at different times), native language spoken by different programming teams, different expertise among teams, some combination thereof, and so forth.

In one or more example embodiments, a stipulation 212 of the coordination policy 210 may indicate that visual synchronization of the image content of the logical windows 202 is to occur prior to the display of any of the pixels of the logical windows 202. A hybrid application, or another application with asynchronous processes 204, may create an appearance of a monolithic application by preparing a combination of pixels from different logical windows 202 prior to displaying the pixel combination. More specifically, an application prepares image content of the first and second logical windows 202-1 and 202-2, composites the prepared image content, and presents the pixels of the composited result in a single screen refresh. Alternatively, instead of relying on a stipulation 212, the compositing and joint presentation behavior for visual synchronization may be implemented as a default feature of the inter-context coordination module 114.

FIG. 3 depicts, at 300 generally, an example inter-context communication mechanism 206 that implements one or more coordination polices 210. As illustrated, FIG. 3 depicts the inter-context communication mechanism 206 facilitating communication of a coordination policy 210 between the first process 204-1 and the second process 204-2. In one or more example implementations, a coordination policy 210 includes an event routing policy 302, a pixel authorization policy 304—which may be considered a cloaking policy, some combination thereof, and so forth. The event routing policy 302 includes at least one event routing rule, examples of which are discussed below with particular reference to FIGS. 4-5. The pixel authorization policy 304 includes at least one pixel authorization grant, examples of which are discussed below with particular reference to FIGS. 6-7.

In example embodiments, synchronization of image content may be affected by an order of the application of the policies of the coordination policy 210. Policies may conflict or clash with one another. For instance, a user input event may be capable of triggering multiple policies, but the first triggering policy is the one that is applied. Consequently, a result of a synchronization operation may depend on the order of policy application. The order of application may be adjusted as part of the inter-process communication mechanism 206. An initial order may be established based on an installation of the policies.

FIG. 4 illustrates an example scheme 400 for establishing an event routing policy 302. As illustrated, the scheme 400 includes the first process 204-1, the second process 204-2, the inter-context communication mechanism 206, and one or more conveyances 408. In one or more example implementations, each of the first process 204-1 and the second process 204-2 includes at least an instance or a portion of the inter-context coordination module 114. The first process 204-1 also includes the event routing policy 302. However, the event routing policy 302 may be maintained at a different location, such as by a different process.

In an example operation, the second process 204-2 conveys, via a conveyance 408, at least one event routing rule 402 to the first process 204-1 for inclusion in the event routing policy 302. Two example event routing rules 402 are shown: a location-based event routing rule and a key-based event routing rule. Each event routing rule 402 is associated with the second process 204-2 and includes at least one criterion. A criterion specifies, for instance, a region of a window or a keyboard character code that is to be matched against an aspect of a user input event. If the user input event comports with the criterion, then the user input event is to be handled by the associated second process 204-2. The first process 204-1 or the second process 204-2 may also declare one or more event routing rules 402 that serve as a default routing rule if an event does not comport with any currently-active event routing rule.

In an example of a location-based event routing rule 402, a region of a window is specified, such as the visual window 208 or the second logical window 202-2 (of FIG. 2). The region of the window may be specified in a variety of ways. Examples of specifying the region include use of pixel coordinates, such as a range of pixel coordinates defining a two-dimensional screen area; use of a reference to an object having a known screen location; use of a central coordinate and an accompanying radius; use of a geometric region, such as a particular on-screen rectangular area; an item of displayed image content, which may be specified by a handle; and so forth. A location-based event routing rule 402 may also include an opacity value for the one or more pixels specified. For instance, a pixel may be completely transparent or opaque with respect to the second logical window 202-2. An example of an opacity-based event routing rule 402 is: "route pointer events over pixels with full transparency to a first process, but route events over opaque pixels to a second process." In operation, a window location of a pointer event 404 is compared to the region specified in the location-based event routing rule 402.

For an example of a key-based event routing rule 402, at least one key, such as the letter "A" or a combination of "A" and "CTRL," is specified. The key may be specified as an alphanumeric or ASCII character (e.g., "A," "d," "4," or "%"); as a code or keyboard modifier (e.g., "F10," the "Ctrl" key, or the "Esc" key); some combination thereof (e.g., the "Alt" key plus the letter "h" key or the "Cmd" key plus the letter "B"); and so forth. In operation, a physical or virtual key press of a physical or virtual keyboard for a key event 406 is compared to the at least one key specified in the key-based event routing rule 402.

The scheme 400 enables proactive establishment of event routing rules to be applied to future user input events. Additionally, the scheme 400 enables the event routing policy 302 to be established dynamically. For example, the second process 204-2 can convey a new event routing rule 402 or update an existing event routing rule 402 in response to changes to the second logical window 202-2. For instance, if a UI item 126 is moved to a different screen location, the region specified by the corresponding location-based event routing rule 402 may be updated.

FIG. 5 illustrates an example technique 500 for utilizing an event routing policy 302 to facilitate inter-context coordination. As illustrated, the technique 500 includes the first process 204-1, the second process 204-2, the operating system 110, the user 118, and the user interaction 120. In one or more example implementations, the user 118 creates a user input event 514 with a user input device, such as a mouse, touchscreen, or keyboard. In one example, a pointer event 404 is created by clicking a mouse button or touching a screen at a particular location of the visual window 208, or a key event 406 is created by pressing a key of a keyboard. The user input event 514 is detected by the operating system 110, which then provides an indication 502 of the user input event to the first process 204-1 as illustrated at 506.

More specifically, the operating system 110 may convey the indication 502 to an instance of the inter-context coordination module 114 of the first process 204-1. The inter-context coordination module 114 analyzes the indication 502 with regard to the event routing policy 302. For example, the inter-context coordination module 114 may determine if the indication 502 of the user input event 514 comports with an event routing rule 402 (of FIG. 4). The window location of the pointer event 404, for instance, may be compared to a region specified by a location-based event routing rule 402 to determine if there is a match, or the key of the key event 406 may be compared to at least one key specified by a key-based event routing rule 402 to determine if there is match.

If the indication 502 of the user input event is determined to comport with a particular event routing rule 402, then the process associated with that particular event routing rule 402 is supposed to handle the user input event 514. For example, if a matching event routing rule 402 is associated with the second process 204-2, the inter-context coordination module 114 of the first process 204-1 conveys at 510 the indication 502 of the user input event to the inter-context coordination module 114 of the second process 204-2. The inter-context coordination module 114 then conveys at 512 the indication 502 to a local user I/O handler 504-2 of the second process 204-2 for handling, such as to implement a requested UI action. Alternatively, the inter-context coordination module 114 of the first process 204-1 may convey at 508 the indication 502 to a local user I/O handler 504-1 of the first process 204-1 for handling, such as to implement a requested operation on displayed subject-matter content (e.g., a photograph being refined, a slide being updated, or a webpage being created).

FIG. 6 illustrates an example scheme 600 for establishing a pixel authorization policy 304. As illustrated, the scheme 600 includes the first process 204-1, the second process 204-2, the inter-context communication mechanism 206, and one or more conveyances 608. In one or more example implementations, each of the first process 204-1 and the second process 204-2 includes at least an instance or a portion of the inter-context coordination module 114. The first process 204-1 also includes the pixel authorization policy 304. However, the pixel authorization policy 304 may be maintained at a different location, such as at a different process.

In an example operation, the second process 204-2 conveys, via a conveyance 608, at least one pixel authorization grant 602 to the first process 204-1 for inclusion in the pixel authorization policy 304. Two example pixel authorization grants 602 are shown: an object-based pixel authorization grant and an area-based pixel authorization grant. Each pixel authorization grant 602 is associated with the second process 204-2 and includes at least one criterion. The criterion may include a location in terms of the visual window 208 or a logical window 202 (of FIG. 2) at which a group of pixels is positioned. The criterion may also include a precise indication of a semantic linkage between pixels of e.g. the first logical window 202-1 and some aspect, such as an arrow or a center, of the group of pixels. If responding to a user input event by the first process 204-1 affects the correctness, such as the correct placement, of a group of pixels produced by the second process 204-2 as specified in a pixel authorization grant 602, then the first process 204-1 is authorized to adjust the group of pixels to ameliorate any incorrectness. An adjustment may include, for example, erasing or moving the group of pixels.

For an example of an object-based pixel authorization grant 602, a handle of an object 604 that is displayed via the second logical window 202-2 (of FIG. 2) is specified, such as by identifying or describing targeted content. The handle may name, point to, or otherwise identify a group of pixels forming the object 604. In operation, if the object 604 of the second logical window 202-2 is linked to a pixel or semantic aspect of the image content of the first logical window 202-1, the first process 204-1 is authorized to (e.g., responsible for, obligated to, or empowered to) adjust pixels of the object 604 if an accuracy of the linkage becomes or will be jeopardized by responding to a user input event. Although the object 604 is depicted as an annotation with a lead line, a group of pixels forming an object 604 may take another form, such as an icon, a button, a symbol, and so forth.

In an example of an area-based pixel authorization grant 602, a description of an area 606 of the second logical window 202-2 (of FIG. 2) is specified, such as by reference to an area of pixel coordinates. The description of the area 606 may include a location within a visual window 208, may include a name of a geographic shape, may be realized as a matrix of relevant dispersed pixels that form the area, or may otherwise identify a group of pixels of the area 606. The description of the area 606 may be per-pixel, per-shape, per-rectangle, per-window, some combination thereof, and so forth. In operation, if the area 606 of the second logical window 202-2 is linked to a pixel or semantic aspect of image content of the first logical window 202-1, the first process 204-1 is authorized to adjust the group of pixels of the area 606 if an accuracy of the linkage becomes or will be jeopardized by responding to a user input event. Although the area 606 is depicted as a rectangle, an area 606 may take a different geometric shape, a random pattern, a shape of some emblem, and so forth.

The pixel authorization policy 304 may be considered a cloaking policy, and pixel authorization grants 602 may be considered cloaking filters. A pixel authorization grant 602 allows one process to temporarily modify the image content of a logical window that is managed by another process. A specific example is an authorization grant to "erase (e.g., visually suppress) the contents of an HTML highlight area until a next draw event from the HTML process" is received. A trigger for this authorization grant is "an event that modifies a view transform of the contents of the other logical window."

The scheme 600 enables proactive establishment of pixel authorization grants to be applied to future user input events. Additionally, the scheme 600 enables the pixel authorization policy 304 to be established dynamically. For example, the second process 204-2 can convey a new pixel authorization grant 602 or update an existing pixel authorization grant 602 in response to changes to the second logical window 202-2. For instance, if a UI item 126 overlay is drawn via the second logical window 202-2 on top of subject-matter content displayed in the first logical window 202-1, a new area-based pixel authorization grant 602 that describes the pixels of the new UI item 126 may be conveyed by the second process 204-2 to the first process 204-1 for the pixel authorization policy 304.

FIG. 7 illustrates an example technique 700 for utilizing a pixel authorization policy 304 to facilitate inter-context coordination. As illustrated, the technique 700 includes the first process 204-1, the second process 204-2, the operating system 110, the user 118, the user interaction 120, and canvas image content 716 and 718. Specifically, FIG. 7 includes first canvas image content 716 and second canvas image content 718. The first canvas image content 716 corresponds to a view of a photograph prior to a view change operation. The second canvas image content 718 corresponds to a view of a photograph after a view change operation. The canvas image content is a photograph including a bird and the Eiffel tower that is displayed by the first process 204-1 via the first logical window 202-1 (of FIG. 2). A UI item 126, which is drawn over the canvas image content and annotates some aspect of the bird in the photograph, is displayed by the second process 204-2 via the second logical window 202-2 as part of UI image content.

In one or more example implementations, the user 118 creates a user input event 714 with a user input device, such as a mouse, touchscreen, or keyboard. For example, a view change event may correspond to scrolling the canvas image content, zooming the canvas image content to increase or decrease a zoom level, resizing a visual window, or another operation that breaks a semantic linkage between different image content managed by different processes, or some combination thereof. The user input event 714 is detected by the operating system 110, which provides an indication 702 of the user input event to the first process 204-1 as illustrated at 708.

More specifically, the operating system 110 conveys the indication 702 to an instance of the inter-context coordination module 114 of the first process 204-1. The inter-context coordination module 114 analyzes the indication 702 with regard to the pixel authorization policy 304. For example, the inter-context coordination module 114 may determine if the indication 702 of the user input event 714 comports with a pixel authorization grant 602 (of FIG. 6). If the user input event 714 is a view change operation request on the canvas image content and a group of pixels that is specified by a particular pixel authorization grant 602 is drawn over the canvas image content, for instance, then the user input event 714 comports with the particular pixel authorization grant 602. If the user input event 714 comports with the particular pixel authorization grant 602, the inter-context coordination module 114 conveys at 710 both the indication 702 of the user input event and information about the particular pixel authorization grant 602, such as information to describe the shape and location of the specified group of pixels.

The indication 702 and the information about the particular pixel authorization grant 602 is conveyed to a local user I/O handler 704-1 that handles the view change request operation and also manipulates the group of pixels specified in the particular pixel authorization grant 602. In the illustrated example, the first canvas image content 716 is shown on the left with a UI item 126 annotating an aspect of the bird in the photograph. The view change operation requested by the user input event 714 is a zoom inward or increase zoom level action. After the local user I/O handler 704-1 performs the increase zoom level action, the second canvas image content 718 is produced in which the displayed canvas portion of the application has zoomed into the upper left portion of the image to focus on the bird.

The local user I/O handler 704-1 is also responsible for manipulating the specified group of pixels, which is the UI item 126 in the illustrated example. If the UI item 126 is not manipulated by the first process 204-1, the UI item 126 will be incorrectly pointing to open sky in the second canvas image content 718, at least momentarily. In one example pixel manipulation implementation, the first process 204-1 causes the group of pixels to cease being visible (e.g., erases the pixels) for the second canvas image content 718 under the theory that a wrong annotation indicator is worse than no annotation indicator. In an alternative example pixel manipulation implementation, the first process 204-1 causes the group of pixels to shift positon (e.g., moves the pixels) for the second canvas image content 718 into a correct position such that the shifted group of pixels of the second logical window 202-2 (of FIG. 2) continues to point to a correct aspect of the canvas image content of the first logical window 202-1. As shown, the UI item 126 is shifted such that the UI item 126 continues to point to the bird in the photograph even after the canvas image content has been zoomed. As illustrated at 712, the inter-context coordination module 114 of the first process 204-1 conveys a notification 706 to the inter-context coordination module 114 of the second process 204-2. The notification 706 may indicate which group of pixels were manipulated and if the manipulation was an erasure, a relocation, and so forth.

Having discussed example details of systems and techniques for inter-context coordination to facilitate synchronized presentation of image content, consider now some example procedures to illustrate additional aspects of the techniques.

Example Procedures

This section describes example procedures for inter-context coordination to facilitate synchronized presentation of image content in one or more embodiments. Aspects of the procedures may be implemented in hardware, firmware, or software, or a combination thereof. The procedures are shown as a set of blocks that specify operations that may be performed by one or more devices, but the operations are not necessarily limited to the orders as shown for performing the operations by the respective blocks, for the operations may be performed in other orders or in fully or partially overlapping manners. In at least some embodiments, the procedures may be performed by a suitably configured device, such as an example computing device 102 (of FIG. 1) that makes use of an inter-context coordination module 114.

Figure 8:
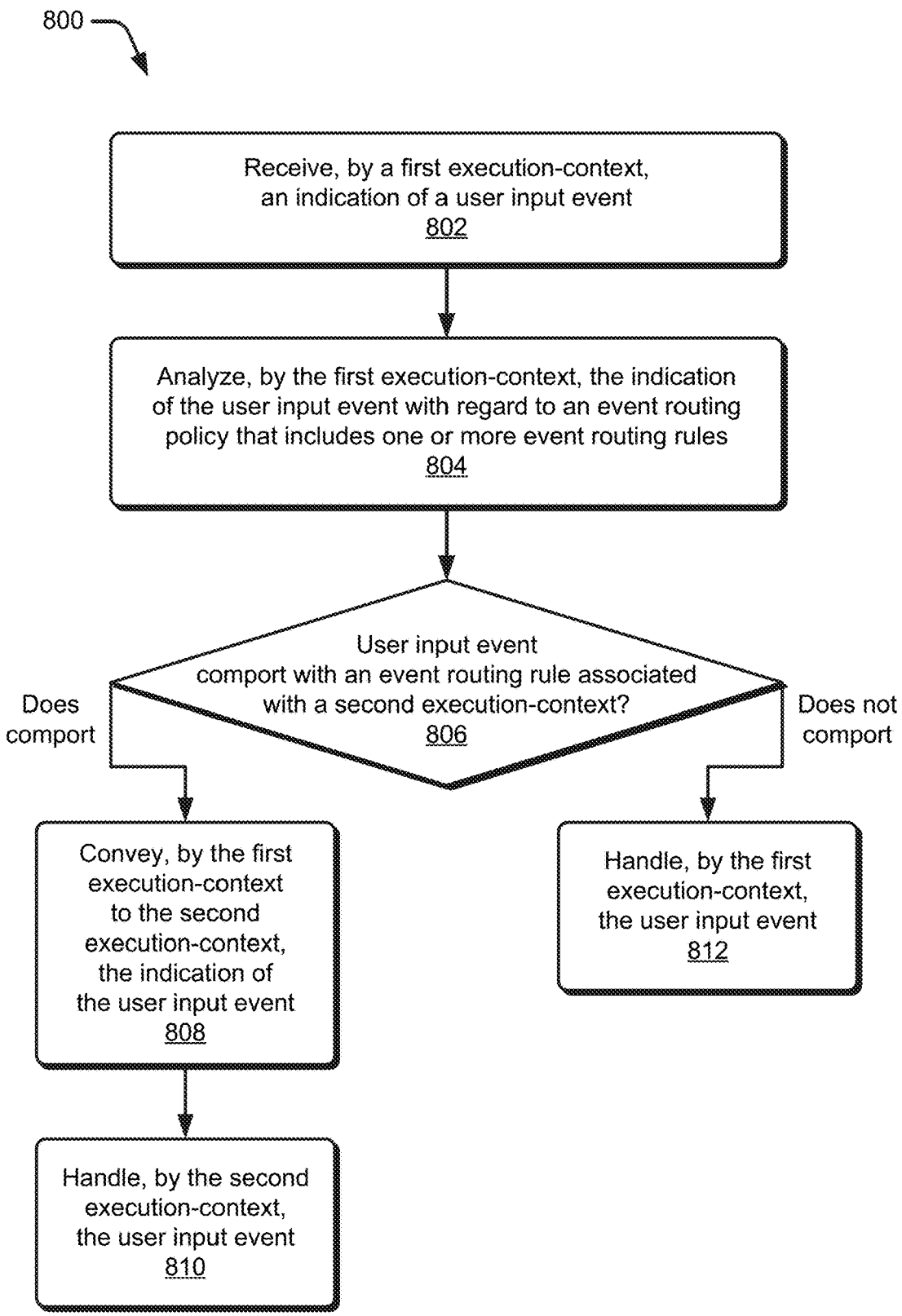
FIG. 8 is a flow diagram illustrating a procedure in accordance with one or more example implementations for inter-context coordination to facilitate synchronized presentation of image content.

FIG. 8 includes six (6) blocks 802-812 and depicts a procedure 800 in accordance with one or more example implementations for inter-context coordination to facilitate synchronized presentation of image content in a scenario with an event routing policy. A first execution context receives an indication of a user input event (block 802). For example, a first execution context 214-1 may receive an indication 502 of a user input event 514 from an operating system 110. For instance, an indication of an "Alt-K" keyboard combination that is pressed by a user 118 may be provided to an instance of an inter-context coordination module 114 of the first execution context 214-1.

The first execution context analyzes the indication of the user input event with regard to an event routing policy that includes one or more event routing rules (block 804). For example, the first execution context 214-1 may analyze the indication 502 of the user input event 514 with regard to an event routing policy 302 that includes one or more event routing rules 402. The inter-context coordination module 114 may, for instance, compare the "Alt-K" keyboard combination to each criterion of each event routing rule 402, which may be a location-based or a key-based event routing rule.

Based on the analysis, it is determined if the user input event comports with an event routing rule associated with a second execution context (block 806). For example, the inter-context coordination module 114 of the first execution context 214-1 may determine if the indicated "Alt-K" keyboard combination matches a key criterion of at least one key-based event routing rule 402 that was previously conveyed by a second execution context 214-2 for the event routing policy 302.

If the user input event is determined to comport with the event routing rule associated with the second execution context, then the first execution context conveys to the second execution context the indication of the user input event (block 808). For example, if the event routing policy 302 includes a key-based event routing rule 402 that is associated with the second execution context 214-2 and that has a criterion matching the indication 502, then the first execution context 214-1 conveys, as illustrated at 510, the indication 502 of the user input event 514 to the second execution context 214-2. For instance, the inter-context coordination module 114 of the first execution context 214-1 may convey the "Alt-K" keyboard combination of the user input event 514 to an inter-context coordination module 114 of the second execution context 214-2. Additionally, the second execution context handles the user input event (block 810). For example, the second execution context 214-2 may handle the user input event 514 in accordance with the indication 502 with respect to user interaction for a second logical window 202-2. A local user I/O handler 504-2 may, for instance, implement a UI command for the second logical window 202-2 that is activated by an "Alt-K" combination, such as displaying a color wheel.

If, on the other hand, the user input event is not determined to comport with an event routing rule that is associated with the second execution context (as determined at block 806), then the first execution context handles the user input event (block 812). For example, the first execution context 214-1 may handle the user input event 514 in accordance with the indication 502 with respect to user interaction for a first logical window 202-1. More specifically, the first execution context 214-1 may handle the user input event 514 if there is a matching event routing rule 402 that is associated with the first execution context 214-1 or if the first execution context 214-1 is a default routing execution context. A local user I/O handler 504-1 may, for instance, implement a command corresponding to the "Alt-K" keyboard combination, with the command affecting subject-matter content of the first logical window 202-1, such as by engaging a color correction operation on a photograph.

Figure 9:
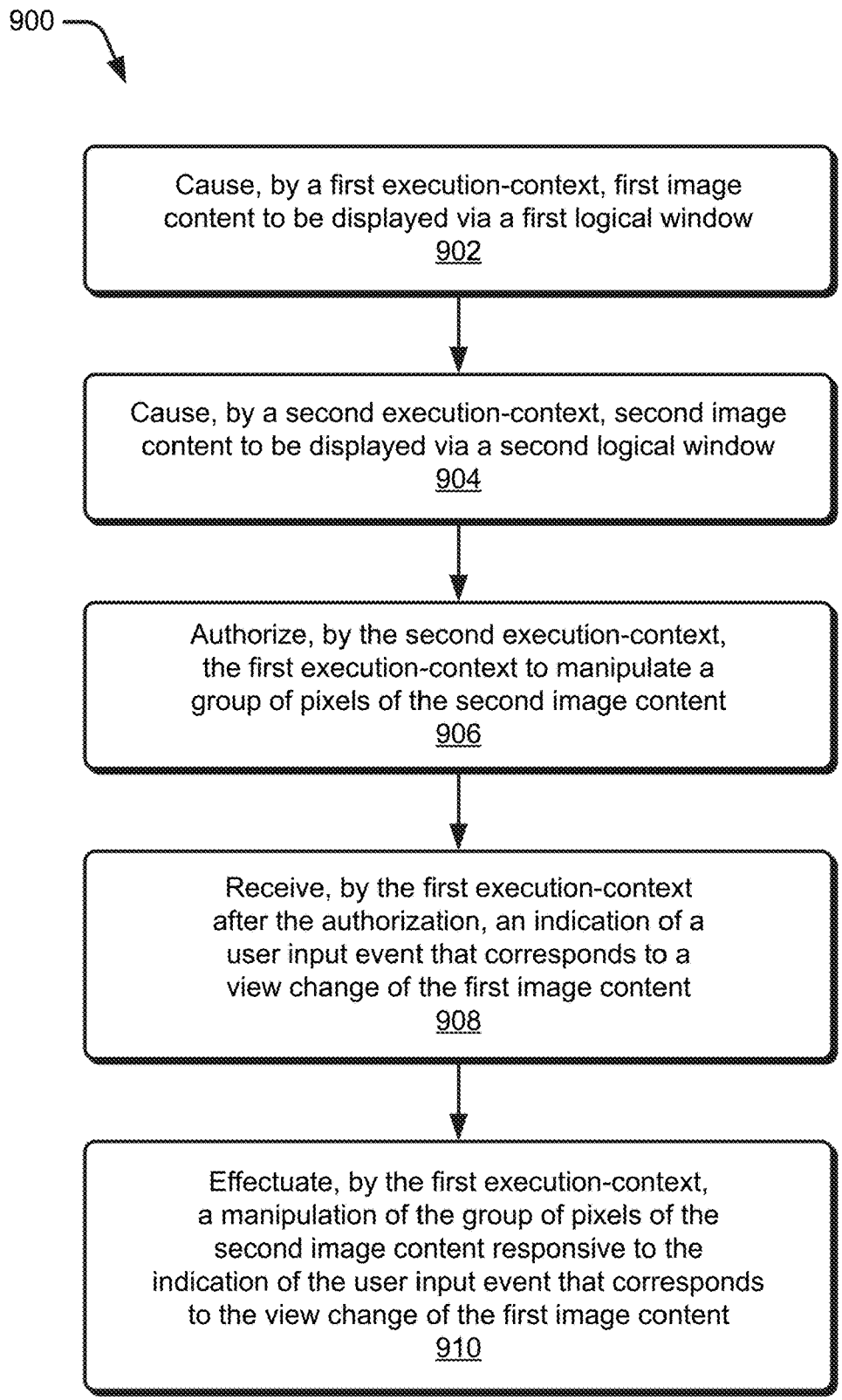
FIG. 9 is another flow diagram illustrating a procedure in accordance with one or more example implementations for inter-context coordination to facilitate synchronized presentation of image content.

FIG. 9 includes five (5) blocks 902-910 and depicts a procedure 900 in accordance with one or more example implementations for inter-context coordination to facilitate synchronized presentation of image content in a scenario with a pixel authorization policy.

A first execution context causes first image content to be displayed via a first logical window (block 902). For example, a first execution context 214-1 may cause a photograph including the Eiffel tower and a flying bird to be displayed via a first logical window 202-1, such as with a first canvas image content 716 in a canvas zone 122. A second execution context causes second image content to be displayed via a second logical window (block 904). For example, a second execution context 214-2 may cause multiple UI items 126 to be displayed via a second logical window 202-2 as at least partially an overlay of the first logical window 202-1. For instance, a UI item 126 that points to the flying bird may be displayed as shown in the first canvas image content 716.

The second execution context authorizes the first execution context to manipulate a group of pixels of the second image content (block 906). For example, the second execution context 214-2 may convey to the first execution context 214-1 a pixel authorization grant 602 for a pixel authorization policy 304 using an inter-context communication mechanism 206. The pixel authorization grant 602 may be an object-based pixel authorization grant 602 that identifies an object 604 or an area-based pixel authorization grant 602 that identifies an area 606. The pixel authorization grant 602 may identify at least one location of the UI item 126, with the at least one location representing a position of the overall UI item 126 or a terminating position of an arrow or a lead line of the UI item 126.

The first execution context receives, after the authorization, an indication of a user input event that corresponds to a view change of the first image content (block 908). For example, the first execution context 214-1 may receive from an operating system 110 an indication 702 of a user input event 714 after the pixel authorization grant 602 was added to the pixel authorization policy 304 at the request of the second execution context 214-2. The indication 702 may describe details of the user input event 714 as a scrolling operation, a zooming operation, another operation that impacts a linkage between the first image content and the second image content, etc. of the photograph of the first canvas image content 716.

The first execution context effectuates a manipulation of the group of pixels of the second image content responsive to the indication of the user input event that corresponds to the view change of the first image content (block 910). For example, in response to a requested scrolling operation that changes the visible view of the photograph in the canvas zone 122, the first execution context 214-1 may adjust the group of pixels identified in the pixel authorization grant 602 as displayed by the second execution context 214-2 via the second logical window 202-2. For instance, a local user I/O handler 704-1 of the first execution context 214-1 (i) may cause the group of pixels to be removed from a display device 108 to prevent an incorrect semantic linkage between the UI item 126 and the photographic image from being presented to a user 118 or (ii) may cause the group of pixels to be shifted to a location that accounts for any sliding or magnifying of the photographic image to maintain a correct semantic linkage between the UI item 126 and the flying bird as shown in the second canvas image content 718.

Having described example procedures in accordance with one or more embodiments, consider now an example system and device that can be utilized to implement the various techniques described herein.

Example System and Device

Figure 10:
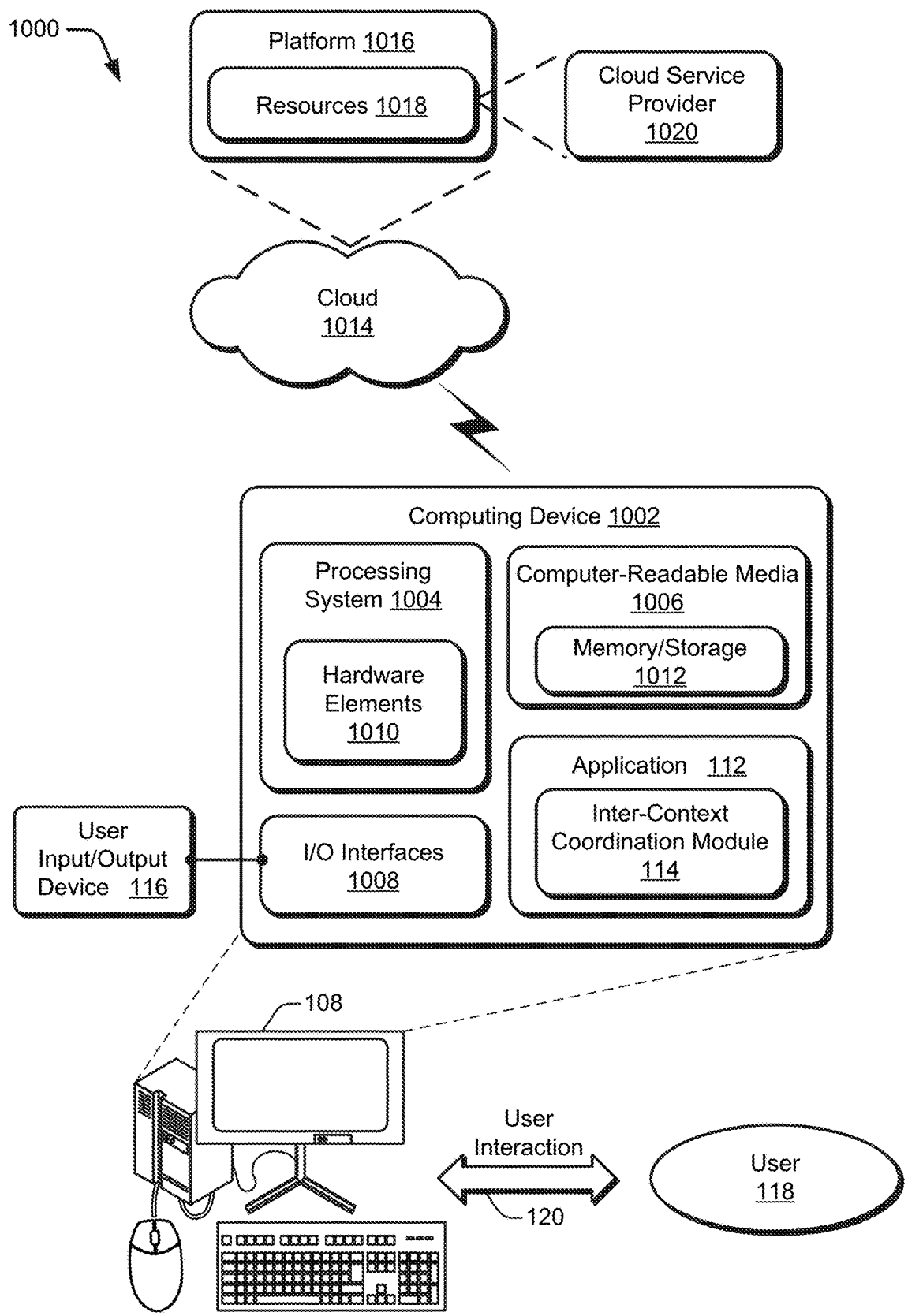
FIG. 10 illustrates an example system including various components of an example device that can be implemented as any type of computing device as described and/or utilized with reference to FIGS. 1-9 to implement embodiments that are described herein.

FIG. 10 illustrates an example system generally at 1000 that includes an example computing device 1002 that is representative of one or more computing systems or computing devices that may implement the various techniques described herein. This is illustrated through the inclusion of an application 112 having an inter-context coordination module 114, which may operate as described herein above. A computing device 1002 may comprise, for example, a computing device 102 (of FIG. 1) that enables user interaction 120 with the user 118, e.g. an end user, via at least one user I/O device 116, such as a display device 108, a mouse, or a keyboard, as shown. Alternatively, although not explicitly shown in FIG. 10, a computing device 1002 may comprise, for example, a server device of a corporate user, an on-chip system or system-on-a-chip (SOC), or any other suitable computing device or computing system.

The example computing device 1002 as illustrated includes at least one processing system 1004, one or more computer-readable media 1006, and one or more I/O interfaces 1008 that may be communicatively coupled, one to another. Although not explicitly shown, the computing device 1002 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including one or more hardware elements 1010 that may be configured as processors, functional blocks, and so forth. This may include implementation in hardware as an application specific integrated circuit (ASIC), a general-purpose processor, or other logic device formed using e.g. one or more semiconductors. The hardware elements 1010 are not limited by the materials from which they are formed or the processing mechanisms employed therein. For example, processors may be comprised of semiconductor(s) or transistors (e.g., electronic integrated circuits (ICs)). In such a context, processor-executable instructions may comprise electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (e.g., random access memory (RAM)) or nonvolatile media (e.g., read only memory (ROM), flash memory, optical discs, or magnetic disks). The memory/storage component 1012 may include fixed media (e.g., RAM, ROM, or a fixed hard drive) or removable media (e.g., a flash memory card, a removable hard drive, or an optical disc). The computer-readable media 1006 may be configured in a variety of other ways as further described below.

Input/output interface(s) 1008 are representative of functionality to allow a user to enter commands or information to computing device 1002 or to allow information to be presented to the user, or other components or devices using various input/output devices (e.g., one or more of user I/O devices 116). Examples of input devices include a keyboard, a cursor control device (e.g., a mouse or touchpad), a microphone, a scanner, touch functionality (e.g., capacitive, resistive, or other sensors that are configured to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a display device 108, such as an LCD or LED screen, a monitor, or a projector), a speaker, a printer, a network card, a haptic vibrating device, or a combination thereof. Thus, the computing device 1002 may be configured in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1006 may include a variety of media that may be accessed by the computing device 1002. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, removable and non-removable media or storage devices implemented in a process or technology suitable for storage of information, such as computer readable instructions, data structures, program modules, logic elements/circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible media, article of manufacture, or combination thereof that is suitable to store desired information and that may be accessed by a computer.

"Computer-readable signal media," as used herein, refers to a signal-bearing medium that is configured to transmit instructions to hardware of the computing device 1002, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal that has one or more of its characteristics set or changed in such a manner as to encode information in the signal. By way of example, but not limitation, computer-readable signal media may include wired media, such as a wired network or direct-wired connection, or wireless media, such as acoustic, RF, microwave, infrared, or other wireless media.

As previously described, hardware elements 1010 and computer-readable media 1006 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1010. The computing device 1002 may be configured to implement particular instructions or functions corresponding to software or hardware modules. Accordingly, implementation of a module that is executable by the computing device 1002 as software may be achieved at least partially in hardware, e.g., through use of computer-readable storage media or the hardware elements 1010 of the processing system 1004. The instructions or functions may be executable/operable by one or more articles of manufacture (e.g., one or more computing devices 1002 or processing systems 1004) to implement techniques, modules, or examples described herein.

The techniques described herein may be supported by various configurations of the computing device 1002 and are not limited to the specific aspects of the example devices described herein. This functionality may also be implemented fully or partially through use of a distributed system, such as over a "cloud" 1014 by a cloud service provider 1020 via a platform 1016 as described below.

The cloud 1014 may include or represent a platform 1016 for resources 1018. The platform 1016 abstracts underlying functionality of hardware (e.g., one or more servers or at least one data center) and software resources of the cloud 1014. The resources 1018 may include applications or data that can be utilized while computer processing is at least partially executed on servers that are remote from, or distributed around, the computing device 1002. Resources 1018 may also include services provided over the Internet or through a subscriber network, such as a cellular or Wi-Fi network.

The platform 1016 may abstract resources and functions to connect the computing device 1002 with other computing devices or services. The platform 1016 may also serve to abstract a scaling of resources to provide a corresponding level of scale to encountered demand for the resources 1018 that are implemented via the platform 1016. Accordingly, in an interconnected device embodiment, implementation of functionality described herein may be distributed throughout the illustrated system of FIG. 10, or at least throughout the cloud 1014 along with the computing device 1002. For example, functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium environment to enable inter-context coordination in a hybrid application, a method implemented by a computing device, the method comprising:

executing, by the computing device, a first process and a second process of the hybrid application that share a visual window associated with the hybrid application, the executing including:
  conveying an event routing policy by the second process to the first process, the event routing policy including an event routing rule to control event routing by the first process for routing to the second process;
  receiving, through execution of the first process, an indication of a user input event by the first process;
  analyzing, through execution of the first process, the indication of the user input event with regard to the event routing policy that includes the event routing rule as stipulated by the second process; and
  responsive to the analyzing through execution of the first process that the user input event comports with the event routing rule associated with the second process:
    conveying the indication of the user input event by the first process to the second process; and
    processing the user input event by the second process.

2. The method as described in claim 1, further comprising incorporating, by the first process, the event routing rule as including a criterion specifying a correspondence between user interaction and the second process.

3. The method as described in claim 2, wherein the conveying and the incorporating are performed during execution of the hybrid application.

4. The method as described in claim 1, wherein the first process and the second process of the hybrid application respectively correspond to logical windows and respective pixels that share the visual window associated with the hybrid application.

5. The method as described in claim 1, wherein:
  the visual window is perceptible to the user that includes multiple pixels;
  a first logical window that is associated with the visual window and includes first image content as controlled by the first process;
  a second logical window that is associated with the visual window and includes second image content as controlled by the second process, the second logical window at least partially overlapping the first logical window; and
  a coordination policy is configured to coordinate handling of user interaction by the first and second processes to establish at least one stipulation of the second process for the coordination policy that is accessible by the first process.

6. The method as described in claim 5, further comprising updating the coordination policy by the second process dynamically based on a change to the second image content that is displayed via the second logical window, the change made by the second process during the execution of the hybrid application.

7. The method as described in claim 5, wherein the coordination policy includes a pixel authorization policy that includes a pixel authorization grant indicative of which of the second process or first process is granted authorization to manipulate pixels of the visual window that are affected by a user input event.

8. The method as described in claim 7, wherein the pixel authorization grant comprises at least one of an object-based pixel authorization grant or an area-based pixel authorization grant.

9. The method as described in claim 1, wherein the event routing rule includes at least one of a location-based event routing rule or a key-based event routing rule.

10. In a digital medium environment to enable inter-context coordination in a hybrid application, a method implemented by a computing device, the method comprising:
  executing, by the computing device, a first process and a second process of the hybrid application that share a visual window associated with the hybrid application, the executing including:
    conveying an event routing policy by the second process to the first process, the event routing policy including an event routing rule to control event routing by the first process to the second process;
    receiving, through execution of the first process, an indication of a user input event by the first process;
    analyzing, through execution of the first process, the indication of the user input event with regard to an event routing policy by the first process that includes an event routing rule stipulated by the second process; and
    processing the user input event by the first process responsive to the analyzing that the user input event does not comport with the event routing rule associated with the second process.

11. The method as described in claim 10, further comprising incorporating, by the first process, the event routing rule as including a criterion specifying a correspondence between user interaction and the second process.

12. The method as described in claim 11, wherein the conveying and the incorporating are performed during execution of the hybrid application.

13. The method as described in claim 10, wherein the first process and the second process of the hybrid application respectively correspond to logical windows and respective pixels that share the visual window associated with the hybrid application.

14. The method as described in claim 10, wherein:
  the visual window is perceptible to the user that includes multiple pixels;
  a first logical window that is associated with the visual window and includes first image content as controlled by the first process;
  a second logical window that is associated with the visual window and includes second image content as controlled by the second process, the second logical window at least partially overlapping the first logical window; and
  the coordination policy is configured to coordinate handling of user interaction by the first and second processes to establish at least one stipulation of the second process for the coordination policy that is accessible by the first process.

15. The method as described in claim 14, further comprising updating the coordination policy by the second process based on a change to the second image content that is displayed via the second logical window, the change made by the second process during the execution of the hybrid application.

16. The method as described in claim 14, wherein the coordination policy includes a pixel authorization policy that includes a pixel authorization grant indicative of which of the second process or first process is granted authorization to manipulate pixels of the visual window that are affected by a user input event.

17. The method as described in claim 16, wherein the pixel authorization grant comprises at least one of an object-based pixel authorization grant or an area-based pixel authorization grant.

18. The method as described in claim 10, wherein the event routing rule includes at least one of a location-based event routing rule or a key-based event routing rule.

19. A system comprising:
    means for executing a first process and a second process of a hybrid application that share a visual window associated with the hybrid application, the executing including:
        means for receiving, through execution of the first process:
            an event routing policy conveyed to the first process from the second process, the event routing policy including an event routing rule to control event routing to the second process; and
            an indication of a user input event by the first process;
        means for analyzing, through execution of the first process, the indication of the user input event with regard to the event routing policy by the first process that includes the event routing rule as stipulated by the second process;
        means for conveying, by the first process to the second process, the indication of the user input event responsive to the analyzing by the first process that the user input event comports with the event routing rule associated with the second process; and
        means for processing the user input event by the second process.

20. The system as described in claim 19, further comprising means for incorporating, by the first process, the event routing rule as including a criterion specifying a correspondence between user interaction and the second process.

* * * * *